United States Patent
Wang

(10) Patent No.: US 10,314,073 B2
(45) Date of Patent: Jun. 4, 2019

(54) DATA TRANSMISSION METHOD AND USER EQUIPMENT

(71) Applicant: Huawei Technologies Co., Ltd., Shenzhen (CN)

(72) Inventor: Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 15/329,976

(22) PCT Filed: Aug. 1, 2014

(86) PCT No.: PCT/CN2014/083567
§ 371 (c)(1),
(2) Date: Jan. 27, 2017

(87) PCT Pub. No.: WO2016/015340
PCT Pub. Date: Feb. 4, 2016

(65) Prior Publication Data
US 2017/0265219 A1    Sep. 14, 2017

(51) Int. Cl.
*H04L 5/00* (2006.01)
*H04W 72/04* (2009.01)
*H04W 72/12* (2009.01)

(52) U.S. Cl.
CPC ....... *H04W 72/1289* (2013.01); *H04L 5/0007* (2013.01); *H04L 5/0044* (2013.01);
(Continued)

(58) Field of Classification Search
CPC .............................................. H04W 72/1289
(Continued)

(56) References Cited

U.S. PATENT DOCUMENTS

| 2012/0002740 A1 | 1/2012 | Han et al. |
| 2012/0063426 A1 | 3/2012 | Noh et al. |
| 2017/0230947 A1* | 8/2017 | Liu ................. H04W 72/042 |

FOREIGN PATENT DOCUMENTS

| CN | 102362473 A | 2/2012 |
| CN | 102461015 A | 5/2012 |
| CN | 103188742 A | 7/2013 |

OTHER PUBLICATIONS

"Physical layer options for D2D discovery," 3GPP TSG RAN WG1 Meeting #73, Fukuoka, Japan, R1-131864, 3rd Generation Partnership Project, Valbonne, France, (May 20-24, 2013).
(Continued)

*Primary Examiner* — Peter G Solinsky
(74) *Attorney, Agent, or Firm* — Leydig, Voit & Mayer, Ltd.

(57) ABSTRACT

Embodiments of the present invention provide a data transmission method and user equipment. The method includes: obtaining, by first user equipment, time resource grouping information, where the time resource grouping information includes physical resource numbers of physical resources in N time resource groups, and N is a positive integer; sending, by the first user equipment, an indication signal, where the indication signal indicates one or more physical resource numbers; determining, by the first user equipment according to the time resource grouping information and the one or more physical resource numbers indicated by the indication signal, time resources occupied by a data signal in the N time resource groups; and sending, by the first user equipment, the data signal by using the time resources occupied by the data signal in the N time resource groups. In the embodiments of the present invention, energy consumption of a receive end can be reduced.

20 Claims, 4 Drawing Sheets

(52) U.S. Cl.
CPC ....... *H04W 72/04* (2013.01); *H04W 72/1263* (2013.01); *H04L 5/0073* (2013.01); *Y02D 70/00* (2018.01)

(58) Field of Classification Search
USPC ........................................................ 370/330
See application file for complete search history.

(56) References Cited

OTHER PUBLICATIONS

"On control signaling and scheduling assignments for D2D," 3GPP TSG-RAN WG1 Meeting #77, Seoul, Korea, XP050789467, R1-142350, 3rd Generation Partnership Project, Valbonne, France (May 19-23, 2014).

"Design details of scheduling assignments," 3GPP TSG RAN WG1 Meeting #77, Seoul, Korea, XP050789598, R1-142480, 3rd Generation Partnership Project, Valbonne, France (May 19-23, 2014).

"Mode 2 resource allocation for D2D communication," 3GPP TSG RAN WG1 Meeting #77, Seoul, Korea, XP050789599, R1-142481, 3rd Generation Partnership Project, Valbonne, France (May 19-23, 2014).

\* cited by examiner

100

```
┌─────────────────────────────────────────────────────────────┐
│ First user equipment obtains time resource grouping         │
│ information, where the time resource grouping information   │ ～ S110
│ includes physical resource numbers of physical resources    │
│ in N time resource groups                                   │
└─────────────────────────────────────────────────────────────┘
                              │
┌─────────────────────────────────────────────────────────────┐
│ The first user equipment sends an indication signal, where  │ ～ S120
│ the indication signal indicates one or more physical        │
│ resource numbers                                            │
└─────────────────────────────────────────────────────────────┘
                              │
┌─────────────────────────────────────────────────────────────┐
│ The first user equipment determines, according to the time  │
│ resource grouping information and the one or more physical  │ ～ S130
│ resource numbers indicated by the indication signal, time   │
│ resources occupied by a data signal in the N time resource  │
│ groups                                                      │
└─────────────────────────────────────────────────────────────┘
                              │
┌─────────────────────────────────────────────────────────────┐
│ The first user equipment sends the data signal by using the │ ～ S140
│ time resources occupied by the data signal in the N time    │
│ resource groups                                             │
└─────────────────────────────────────────────────────────────┘
```

S210: Second user equipment obtains time resource grouping information, where the time resource grouping information includes physical resource numbers of physical resources in N time resource groups S220: The second user equipment receives an indication signal, where the indication signal indicates one or more physical resource numbers S230: The second user equipment determines, according to the time resource grouping information and the one or more physical resource numbers indicated by the indication signal, time resources occupied by a data signal in the N time resource groups S240: The second user equipment obtains the data signal according to the time resources occupied by the data signal in the N time resource groups

Obtaining unit 310

First sending unit 320

Determining unit 330

Second sending unit 340

DATA TRANSMISSION METHOD AND USER EQUIPMENT

CROSS-REFERENCE TO RELATED APPLICATIONS

This application is a National Stage of International Application No. PCT/CN2014/083567, filed on Aug. 1, 2014, which is hereby incorporated by reference in its entirety.

TECHNICAL FIELD

The present invention relates to the communications field, and more specifically, to a data transmission method and user equipment.

BACKGROUND

A device to device proximity service (Device to Device Proximity Service, D2D ProSe for short) between user equipment (User Equipment, UE for short) has become a hot topic of a Long Term Evolution (Long Term Evolution, LTE for short) system.

The D2D ProSe relates to a data signal and an indication signal. The indication signal is used to indicate a frequency resource occupied by the data signal, and the data signal is used to carry data. However, in an existing LTE communications system, the indication signal can indicate only the frequency resource occupied by the data signal. Therefore, a receive end needs to perform blind detection on all possible time resources, to obtain the data signal.

Currently, the indication signal cannot accurately indicate a time resource occupied by the data signal, and therefore, the receive end needs to consume more time and electric energy, to obtain the data signal.

SUMMARY

Embodiments of the present invention provide a data transmission method and user equipment, so as to reduce energy consumption of a receive end.

According to a first aspect, a data transmission method is provided, including: obtaining, by first user equipment, time resource grouping information, where the time resource grouping information includes physical resource numbers of physical resources in N time resource groups, and N is a positive integer; sending, by the first user equipment, an indication signal, such as a scheduling assignment signal (Scheduling Assignment, SA for short), where the indication signal indicates one or more physical resource numbers; determining, by the first user equipment according to the time resource grouping information and the one or more physical resource numbers indicated by the indication signal, time resources (that is, time resource numbers) occupied by a data signal in the N time resource groups, where, for example, the data signal occupies only one time resource number in each time resource group; and sending, by the first user equipment, the data signal by using the time resources occupied by the data signal in the N time resource groups.

With reference to the first aspect, in a first possible implementation manner of the first aspect, the determining, by the first user equipment according to the time resource grouping information and the one or more physical resource numbers indicated by the indication signal, time resources occupied by the data signal in the N time resource groups includes: determining, by the first user equipment according to a formula $n\ \%_{subframe}(n_{group}) = \mathrm{mod}\,(n\ \%_{RPT} + \Delta_f N_{group})$, a time resource number $n\ \%\ (n_{group})$ occupied by the data signal in a time resource group $n_{group}$, where $\mathrm{mod}(\ )$ is a mod function; $n_{group}$ is a time resource group sequence number, and is zero or a positive integer; $n\ \%_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer; and $\Delta_f$ is a time resource adjustment value determined according to a physical resource number.

With reference to the first aspect, in a second possible implementation manner of the first aspect, the determining, by the first user equipment according to the time resource grouping information and the one or more physical resource numbers indicated by the indication signal, time resources occupied by the data signal in the N time resource groups includes: determining, by the first user equipment according to a formula $n\ \%_{subframe}(n_{group}) = \mathrm{mod}\,(n\ \%_{RPT} + \Delta_f + f_{hop}(n_{group}), N_{group})$, a time resource number $n\ \%\ (n_{group})$ occupied by the data signal in a time resource group $n_{group}$, where $\mathrm{mod}(\ )$ is a mod function; $n_{group}$ is a time resource group sequence number, and is zero or a positive integer; $n\ \%_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer; $f(n_{group})$ is a time resource adjustment value of the time resource group $n_{group}$; and $\Delta_f$ is a time resource adjustment value determined according to a physical resource number.

With reference to the second possible implementation manner of the first aspect, in a third possible implementation manner, when $N_{group}=1$, $f(n_{group})=0$; or when $N_{group} \geq 2$, $$f(n_{group}) = \mathrm{mod}\left( \sum_{k=n_{group} \cdot M}^{n_{group} \cdot M + M - 1} c(k) \times 2^{k-(n_{group} \cdot M)}, N_{group} \right) \text{ or}$$

$$f(n_{group}) = \sum_{k=n_{group} \cdot M}^{n_{group} \cdot M + M - 1} c(k) \times 2^{k-(n_{group} \cdot M)},$$

where M is a positive integer that is not less than $\log_2 N_{group}$, and $c(k)$ is a pseudo-random sequence.

With reference to the second possible implementation manner of the first aspect, in a fourth possible implementation manner, when $N_{group}=1$, $f(n_{group})=0$; or when $N_{group} \geq 2$, $$f(n_{group}) =$$

$$\mathrm{mod}\left( f(n_{group} - 1) + \sum_{k=n_{group} \cdot M}^{n_{group} \cdot M + M - 1} c(k) \times 2^{k-(n_{group} \cdot M)}, N_{group} \right) \text{ or}$$

$$f(n_{group}) = f(n_{group} - 1) + \sum_{k=n_{group} \cdot M}^{n_{group} \cdot M + M - 1} c(k) \times 2^{k-(n_{group} \cdot M)},$$

where M is a positive integer that is not less than $\log_2 N_{group}$, $c(k)$ is a pseudo-random sequence, and $f(-1)=0$.

With reference to the fourth possible implementation manner of the first aspect, in a fifth possible implementation manner, when $N_{group} > 2$, $$f(n_{group}) = \text{mod} f(n_{group} - 1) +$$

$$\text{mod}\left(\sum_{k=n_{group}\cdot M}^{n_{group}\cdot M+M-1} c(k) \times 2^{k-(n_{group}\cdot M)}, N_{group} - L\right) + L, N_{group}$$

or $$f(n_{group}) =$$

$$f(n_{group} - 1) + \text{mod}\left(\sum_{k=n_{group}\cdot M}^{n_{group}\cdot M+M-1} c(k) \times 2^{k-(n_{group}\cdot M)}, N_{group} - L\right) + L,$$

where L is a positive integer and $1 \leq L \leq N_{group}$.

With reference to the first aspect, in a sixth possible implementation manner, the time resources occupied by the data signal in the N time resource groups have a same time resource number.

With reference to any one of the first to the fifth possible implementation manners of the first aspect, in a seventh possible implementation manner, $\Delta_f = f_{RPT} \cdot n_{group}$ or $\Delta_f = (\text{mod}(f \%_{RPT}, N_{group} - K) + K) \cdot n_{group}$, where $f \%_{RPT}$ is a frequency resource number determined according to any one of the one or more physical resource numbers indicated by the indication signal, and is zero or a positive integer, and K is a positive integer and $1 \leq K < N_{group}$.

With reference to the seventh possible implementation manner of the first aspect, in an eighth possible implementation manner, if any one of the one or more physical resource numbers indicated by the indication signal is p, $n \%_{RPT} = \text{mod}(p, N_{group})$ and $f \%_{RPT} = \text{floor}(p/N_{group})$, where floor( ) is a round-down function, and p is zero or a positive integer.

With reference to the seventh possible implementation manner of the first aspect, in a ninth possible implementation manner, if any one of the one or more physical resource numbers indicated by the indication signal includes a time resource number $x_{rpt}$ and a frequency resource number $f_{rpt}$, $n \%_{RPT} = x_{rpt}$, and $f \%_{RPT} = f_{rpt}$ or $f_{RPT} = f_{rpt} + \text{Frequency\_hopping}(n_{group})$, where Frequency_hopping($n_{group}$) is a frequency resource adjustment value of the time resource group $n_{group}$, and $x_{rpt}$ and $f_{rpt}$ are zero or positive integers.

With reference to any one of the third to the fifth possible implementation manners of the first aspect, in a tenth possible implementation manner, an initialization sequence of the pseudo-random sequence c(k) is as follows: $c_{init} = N_{ID}^{cell}$, or $c_{init} = 510$, or $c_{init} = 2^9 \cdot \text{mod}(n_f, 4) + N_{ID}^{cell}$, or $c_{init} = 2^9 \cdot \text{mod}(n_f, 4) + 510$, where $N_{ID}^{cell}$ is a physical layer cell identifier, and $n_f$ is a system frame quantity.

With reference to any one of the first aspect, or the first to the tenth possible implementation manners of the first aspect, in an eleventh possible implementation manner, that the indication signal indicates one or more physical resource numbers includes: the indication signal includes a resource-pattern-of-transmission field, where the resource-pattern-of-transmission field is used to indicate the one or more physical resource numbers.

With reference to any one of the first aspect, or the first to the tenth possible implementation manners of the first aspect, in a twelfth possible implementation manner of the first aspect, the obtaining, by first user equipment, time resource grouping information includes: obtaining, by the first user equipment, the time resource grouping information according to a correspondence between a time resource number and a time resource, where the correspondence between a time resource number and a time resource is preset, or is fed back by a receive end, or is provided by a third party, such as a base station.

With reference to any one of the first aspect, or the first to the tenth possible implementation manners of the first aspect, in a thirteenth implementation manner of the first aspect, the time resource grouping information is as follows:

if the time resources such as 20 subframes are grouped into five groups, each time resource group includes k time resources, each time resource includes t frequency resources, and there are a total of k×t physical resources, where k and t are positive integers, in each time resource group, time resource numbers of the physical resources are $0, 1, \ldots, k-1$, frequency resource numbers of the physical resources are $0, 1, \ldots, t-1$, and physical resource numbers of the physical resources are $0, 1, \ldots, k \times t - 1$.

With reference to the eleventh possible implementation manner of the first aspect, in a fourteenth possible implementation manner, the indication signal includes one resource-pattern-of-transmission field, where the resource-pattern-of-transmission field is used to indicate a time resource number and a frequency resource number of the one or more physical resources.

With reference to the eleventh possible implementation manner of the first aspect, in a fifteenth possible implementation manner, the indication signal includes two resource-pattern-of-transmission fields, where one resource-pattern-of-transmission field is used to indicate a time resource number of the one or more physical resources, and the other resource-pattern-of-transmission field is used to indicate a frequency resource number of the one or more physical resources.

According to a second aspect, a data transmission method is provided, including: obtaining, by second user equipment, time resource grouping information, where the time resource grouping information includes physical resource numbers of physical resources in N time resource groups, and N is a positive integer; receiving, by the second user equipment, an indication signal, such as a scheduling assignment signal (Scheduling Assignment, SA for short), where the indication signal indicates one or more physical resource numbers; determining, by the second user equipment according to the time resource grouping information and the one or more physical resource numbers indicated by the indication signal, time resources occupied by a data signal in the N time resource groups, where, for example, the data signal occupies only one time resource in each time resource group; and obtaining, by the second user equipment, the data signal according to the time resources occupied by the data signal in the N time resource groups.

With reference to the second aspect, in a first possible implementation manner of the second aspect, the determining, by the second user equipment according to the time resource grouping information and the one or more physical resource numbers indicated by the indication signal, time resources occupied by a data signal in the N time resource groups includes: determining, by the second user equipment according to a formula $n \%_{subframe}(n_{group}) = \text{mod}(n \%_{RPT} + \Delta_f, N_{group})$, a time resource number $n \% (n_{group})$ occupied by the data signal in a time resource group $n_{group}$, where mod( ) is a mod function; $n_{group}$ is a time resource group sequence number, and is zero or a positive integer; $n \%_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer; and $\Delta_f$ is a time resource adjustment value determined according to a physical resource number.

With reference to the second aspect, in a second possible implementation manner of the second aspect, the determining, by the second user equipment according to the time resource grouping information and the one or more physical resource numbers indicated by the indication signal, time resources occupied by a data signal in the N time resource groups includes: determining, by the second user equipment according to a formula $n \%_{subframe}(n_{group})=\text{mod}(n \%_{RPT}+\Delta_f+f_{hop}(n_{group}),N_{group})$, a time resource number $n \% (n_{group})$ occupied by the data signal in a time resource group $n_{group}$, where mod( ) is a mod function; $n_{group}$ is a time resource group sequence number, and is zero or a positive integer; $n \%_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer; $f(n_{group})$ is a time resource adjustment value of the time resource group $n_{group}$; and $\Delta_f$ is a time resource adjustment value determined according to a physical resource number.

With reference to the second possible implementation manner of the second) aspect, in a third possible implementation manner, when $N_{group}=1$, $f(n_{group})=0$; or when $N_{group} \geq 2$, $$f(n_{group}) = \text{mod}\left(\sum_{k=n_{group} \cdot M}^{n_{group} \cdot M+M-1} c(k) \times 2^{k-(n_{group} \cdot M)}, N_{group}\right) \text{ or}$$

$$f(n_{group}) = \sum_{k=n_{group} \cdot M}^{n_{group} \cdot M+M-1} c(k) \times 2^{k-(n_{group} \cdot M)},$$

where M is a positive integer that is not less than $\log_2^{N_{group}}$, and c(k) is a pseudo-random sequence.

With reference to the second possible implementation manner of the second aspect, in a fourth possible implementation manner, when $N_{group}=1$, $f(n_{group})=0$; or when $N_{group} \geq 2$, $$f(n_{group}) =$$

$$\text{mod}\left(f(n_{group}-1) + \sum_{k=n_{group} \cdot M}^{n_{group} \cdot M+M-1} c(k) \times 2^{k-(n_{group} \cdot M)}, N_{group}\right) \text{ or}$$

$$f(n_{group}) = f(n_{group}-1) + \sum_{k=n_{group} \cdot M}^{n_{group} \cdot M+M-1} c(k) \times 2^{k-(n_{group} \cdot M)},$$

where M is a positive integer that is not less than $\log_2^{N_{group}}$, c(k) is a pseudo-random sequence, and $f(-1)=0$.

With reference to the fourth possible implementation manner of the second aspect, in a fifth possible implementation manner, when $N_{group} \geq 2$, $$f(n_{group}) = \text{mod}\left(f(n_{group}-1) + \text{mod}\left(\sum_{k=n_{group} \cdot M}^{n_{group} \cdot M+M-1} c(k) \times 2^{k-(n_{group} \cdot M)}, N_{group}-L\right)+L, N_{group}\right)$$

or $$f(n_{group}) =$$

$$f(n_{group}-1) + \text{mod}\left(\sum_{k=n_{group} \cdot M}^{n_{group} \cdot M+M-1} c(k) \times 2^{k-(n_{group} \cdot M)}, N_{group}-L\right)+L,$$

where L is a positive integer and $1 \leq L \leq N_{group}$.

With reference to the second aspect, in a sixth possible implementation manner, the time resources occupied by the data signal in the N time resource groups have a same time resource number.

With reference to any one of the first to the fifth possible implementation manners of the second aspect, in a seventh possible implementation manner, $\Delta f = \tilde{f}_{RPT} \cdot n_{group}$ or $\Delta_f = (\text{mod}(f \%_{RPT}, N_{group}-K)+K) \cdot n_{group}$, where $f \%_{RPT}$ is a frequency resource number determined according to any one of the one or more physical resource numbers indicated by the indication signal, and is zero or a positive integer, and K is a positive integer and $1 \leq K < N_{group}$.

With reference to the seventh possible implementation manner of the second aspect, in an eighth possible implementation manner, if any one of the one or more physical resource numbers indicated by the indication signal is p $n \%_{RPT}=\text{mod}(p,N_{group})$ and $f \%_{RPT}=\text{floor}(p/N_{group})$, where floor( ) is a round-down function, and p is zero or a positive integer.

With reference to the seventh possible implementation manner of the second aspect, in a ninth possible implementation manner, if any one of the one or more physical resource numbers indicated by the indication signal includes a time resource number $x_{rpt}$ and a frequency resource number $f_{rpt}$, $n \%_{RPT}=x_{rpt}$, and $\tilde{f} \%_{RPT}=f_{rpt}$ or $\tilde{f}_{RPT}=f_{rpt}+\text{Frequency\_hopping}(n_{group})$, where Frequency_hopping($n_{group}$) is a frequency resource adjustment value of the time resource group $n_{group}$, and $x_{rpt}$ and $f_{rpt}$ are zero or positive integers.

With reference to any one of the third to the fifth possible implementation manners of the second aspect, in a tenth possible implementation manner, an initialization sequence of the pseudo-random sequence c(k) is as follows: $c_{init}=N_{ID}^{cell}$, or $c_{init}=510$, or $c_{init}=2^9 \cdot \text{mod}(n_f, 4)+N_{ID}^{cell}$, or $c_{init}=2^9 \cdot \text{mod}(n_f, 4)+510$, where $N_{ID}^{cell}$ is a physical layer cell identifier, and $n_f$ is a system frame quantity.

With reference to any one of the second aspect, or the first to the tenth possible implementation manners of the second aspect, in an eleventh possible implementation manner, that the indication signal indicates one or more physical resource numbers includes: the indication signal includes a resource-pattern-of-transmission field, where the resource-pattern-of-transmission field is used to indicate the one or more physical resource numbers.

With reference to any one of the second aspect, or the first to the tenth possible implementation manners of the second aspect, in a twelfth possible implementation manner of the second aspect, the obtaining, by second user equipment, time resource grouping information includes: obtaining, by the second user equipment, the time resource grouping information according to a correspondence between a time resource number and a time resource, where the correspondence between a time resource number and a time resource is preset, or is fed back by a transmit end, or is provided by a third party, such as a base station.

With reference to any one of the second aspect, or the first to the tenth possible implementation manners of the second aspect, in a thirteenth implementation manner of the second aspect, the time resource grouping information is as follows:

if the time resources such as 20 subframes are grouped into five groups, each time resource group includes k time resources, each time resource includes t frequency resources, and there are a total of k×t physical resources, where k and t are positive integers, in each time resource group, time resource numbers of the physical resources are 0, 1, ..., k−1, frequency resource numbers of the physical resources are 0, 1, ..., t−1 and physical resource numbers of the physical resources are 0, 1, ..., k×t−1.

With reference to the second aspect, in a fourteenth possible implementation manner, the obtaining, by the second user equipment, the data signal by using the time resources occupied by the data signal in the N time resource groups includes: determining, by the second user equipment according to a correspondence between time resource numbers occupied by the data signal in the N time resource groups and time resources, the time resources corresponding to the resource numbers, and obtaining the data signal by using the time resources occupied by the data signal in the N time resource groups, where the correspondence between the time resource numbers occupied by the data signal in the N time resource groups and the time resources is preset, or is obtained from a transmit end, or is obtained from a third party, such as a base station.

With reference to the second aspect, in a fifteenth possible implementation manner of the second aspect, the method further includes: receiving, by the second user equipment, a correspondence between a time resource number and a time resource.

With reference to the eleventh possible implementation manner of the second aspect, in a sixteenth possible implementation manner, the indication signal includes one resource-pattern-of-transmission field, where the resource-pattern-of-transmission field is used to indicate a time resource number and a frequency resource number of the one or more physical resources.

With reference to the eleventh possible implementation manner of the second aspect, in a seventeenth possible implementation manner, the indication signal includes two resource-pattern-of-transmission fields, where one resource-pattern-of-transmission field is used to indicate a time resource number of the one or more physical resources, and the other resource-pattern-of-transmission field is used to indicate a frequency resource number of the one or more physical resources.

According to a third aspect, user equipment is provided, including: an obtaining unit, configured to obtain time resource grouping information, where the time resource grouping information includes physical resource numbers of physical resources in N time resource groups, and N is a positive integer; a first sending unit, configured to send an indication signal, such as a scheduling assignment signal (Scheduling Assignment, SA for short), where the indication signal indicates one or more physical resource numbers; a determining unit, configured to determine, according to the time resource grouping information and the one or more physical resource numbers indicated by the indication signal, time resources occupied by a data signal in the N time resource groups, where, for example, the data signal occupies only one time resource in each time resource group; and a second sending unit, configured to send the data signal by using the time resources occupied by the data signal in the N time resource groups.

With reference to the third aspect, in a first possible implementation manner, the determining unit is specifically configured to determine, according to a formula n $\%_{subframe}$ $(n_{group})$=mod $(n \%_{RPT}+\Delta_f, N_{group})$, a time resource number n $\%$ $(n_{group})$ occupied by the data signal in a time resource group $n_{group}$, where mod( ) is a mod function; $n_{group}$ is a time resource group sequence number, and is zero or a positive integer; n $\%_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer; and $\Delta_f$ is a time resource adjustment value determined according to a physical resource number.

With reference to the third aspect, in a second possible implementation manner, the determining unit is specifically configured to determine, according to a formula n $\%_{subframe}$ $(n_{group})$=mod $(n \%_{RPT}+\Delta_f+f_{hop}(n_{group}), N_{group})$, a time resource number n $\%$ $(n_{group})$ occupied by the data signal in a time resource group $n_{group}$, where mod( ) is a mod function; $n_{group}$ is a time resource group sequence number, and is zero or a positive integer; n $\%_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer; $f(n_{group})$ is a time resource adjustment value of the time resource group $n_{group}$; and $\Delta_f$ is a time resource adjustment value determined according to a physical resource number.

With reference to the second possible implementation manner of the third aspect, in a third possible implementation manner, when $N_{group}=1$, $f(n_{group})=0$; or when $N_{group}\geq 2$, $$f(n_{group}) = \mod\left(\sum_{k=n_{group}\cdot M}^{n_{group}\cdot M+M-1} c(k)\times 2^{k-(n_{group}\cdot M)}, N_{group}\right) \text{ or}$$

$$f(n_{group}) = \sum_{k=n_{group}\cdot M}^{n_{group}\cdot M+M-1} c(k)\times 2^{k-(n_{group}\cdot M)},$$

where M is a positive integer that is not less than $\log_2^{N_{group}}$, and c(k) is a pseudo-random sequence.

With reference to the second possible implementation manner of the third aspect, in a fourth possible implementation manner, when $N_{group}=1$, $f(n_{group})=0$; or when $N_{group}\geq 2$, $$f(n_{group}) = \mod\left(f(n_{group}-1)+\sum_{k=n_{group}\cdot M}^{n_{group}\cdot M+M-1} c(k)\times 2^{k-(n_{group}\cdot M)}, N_{group}\right)$$

or $$f(n_{group}) = f(n_{group}-1)+\sum_{k=n_{group}\cdot M}^{n_{group}\cdot M+M-1} c(k)\times 2^{k-(n_{group}\cdot M)},$$

where M is a positive integer that is not less than $\log_2^{N_{group}}$, c(k) is a pseudo-random sequence, and f(−1)=0.

With reference to the fourth possible implementation manner of the third aspect, in a fifth possible implementation manner, when $N_{group} > 2$, $$f(n_{group}) = \mod\left(f(n_{group} - 1) + \mod\left(\sum_{k=n_{group} \cdot M}^{n_{group} \cdot M + M - 1} c(k) \times 2^{k-(n_{group} \cdot M)}, N_{group} - L\right) + L, N_{group}\right)$$

or $$f(n_{group}) = f(n_{group} - 1) + \mod\left(\sum_{k=n_{group} \cdot M}^{n_{group} \cdot M + M - 1} c(k) \times 2^{k-(n_{group} \cdot M)}, N_{group} - L\right) + L,$$

where L is a positive integer and $1 \leq L \leq N_{group}$.

With reference to the third aspect, in a sixth possible implementation manner, the time resources occupied by the data signal in the N time resource groups have a same time resource number.

With reference to any one of the first to the fifth possible implementation manners of the third aspect, in a seventh possible implementation manner $\Delta_f = \tilde{f}_{RPT} \cdot n_{group}$ or $\Delta_f = (\mod(f \%_{RPT}, N_{group} - K) + K) \cdot n_{group}$, where $f \%_{RPT}$ is a frequency resource number determined according to any one of the one or more physical resource numbers indicated by the indication signal, and is zero or a positive integer, and K is a positive integer and $1 \leq K < N_{group}$.

With reference to the seventh possible implementation manner of the third aspect, in an eighth possible implementation manner, if any one of the one or more physical resource numbers indicated by the indication signal is p, n $\%_{RPT} = \mod(p, N_{group})$ and $f \%_{RPT} = \text{floor}(p/N_{group})$, where floor( ) is a round-down function, and p is zero or a positive integer.

With reference to the seventh possible implementation manner of the third aspect, in a ninth possible implementation manner, if any one of the one or more physical resource numbers indicated by the indication signal includes a time resource number $x_{rpt}$ and a frequency resource number $f_{rpt}$, n $\%_{RPT} = x_{rpt}$, and $f \%_{RPT} = f_{rpt}$ or $\tilde{f}_{RPT} = f_{rpt} + \text{Frequency\_hopping}(n_{group})$, where $\text{Frequency\_hopping}(n_{group})$ is a frequency resource adjustment value of the time resource group $n_{group}$, and $x_{rpt}$ and $f_{rpt}$ are zero or positive integers.

With reference to any one of the third to the fifth possible implementation manners of the third aspect, in a tenth possible implementation manner, an initialization sequence of the pseudo-random sequence c(k) is as follows: $c_{init} = N_{ID}^{cell}$, or $c_{init} = 510$, or $c_{init} = 2^9 \cdot \mod(n_f, 4) + N_{ID}^{cell}$, or $c_{init} = 2^9 \cdot \mod(n_f, 4) + 510$, where $N_{ID}^{cell}$ is a physical layer cell identifier, and $n_f$ is a system frame quantity.

With reference to the third aspect, or the first to the tenth possible implementation manners of the third aspect, in an eleventh possible implementation manner, that the indication signal indicates a physical resource number of one or more physical resources includes: the indication signal includes a resource-pattern-of-transmission field, where the resource-pattern-of-transmission field is used to indicate the one or more physical resource numbers.

With reference to any one of the third aspect, or the first to the tenth possible implementation manners of the third aspect, in a twelfth implementation manner of the third aspect, the obtaining unit is specifically configured to obtain the time resource grouping information according to a correspondence between a time resource number and a time resource, where the correspondence between a time resource number and a time resource is preset, or is fed back by a receive end, or is provided by a third party, such as a base station.

With reference to any one of the third aspect, or the first to the tenth possible implementation manners of the third aspect, in a thirteenth implementation manner of the third aspect, the time resource grouping information is as follows: if the time resources such as 20 subframes are grouped into five groups, each time resource group includes k time resources, each time resource includes t frequency resources, and there are a total of k×t physical resources, where k and t are positive integers, in each time resource group, time resource numbers of the physical resources are 0, 1, ..., k−1, frequency resource numbers of the physical resources are 0, 1, ..., t−1, and physical resource numbers of the physical resources are 0, 1, ..., k×t−1.

With reference to the eleventh possible implementation manner of the third aspect, in a fourteenth possible implementation manner, the indication signal includes one resource-pattern-of-transmission field, where the resource-pattern-of-transmission field is used to indicate a time resource number and a frequency resource number of the one or more physical resources.

With reference to the eleventh possible implementation manner of the third aspect, in a fifteenth possible implementation manner, the indication signal includes two resource-pattern-of-transmission fields, where one resource-pattern-of-transmission field is used to indicate a time resource number of the one or more physical resources, and the other resource-pattern-of-transmission field is used to indicate a frequency resource number of the one or more physical resources.

According to a fourth aspect, user equipment is provided, including: a first obtaining unit, configured to obtain time resource grouping information, where the time resource grouping information includes physical resource numbers of physical resources in N time resource groups, and N is a positive integer; a receiving unit, configured to receive an indication signal, such as a scheduling assignment signal (Scheduling Assignment, SA for short), where the indication signal indicates one or more physical resource numbers; a determining unit, configured to determine, according to the time resource grouping information and the one or more physical resource numbers indicated by the indication signal, time resources occupied by a data signal in the N time resource groups, where, for example, the data signal occupies only one time resource in each time resource group; and a second obtaining unit, configured to obtain the data signal according to the time resources occupied by the data signal in the N time resource groups.

With reference to the fourth aspect, in a first possible implementation manner, the determining unit is specifically configured to determine, according to a formula n $\%_{subframe}$ $(n_{group}) = \mod(n \%_{RPT} + \Delta_f, N_{group})$, a time resource number n % $(n_{group})$ occupied by the data signal in a time resource group $n_{group}$, where mod( ) is a mod function; $n_{group}$ is a time resource group sequence number, and is zero or a positive integer; n $\%_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer; and $\Delta_f$ is a time resource adjustment value determined according to a physical resource number.

With reference to the fourth aspect, in a second possible implementation manner, the determining unit is specifically configured to determine, according to a formula n %$_{subframe}$ ($n_{group}$)=mod (n %$_{RPT}$+$\Delta_f$+$f_{hop}$($n_{group}$),$N_{group}$), a time resource number n % ($n_{group}$) occupied by the data signal in a time resource group $n_{group}$, where mod( ) is a mod function; $n_{group}$ is a time resource group sequence number, and is zero or a positive integer; n %$_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer; f($n_{group}$) is a time resource adjustment value of the time resource group $n_{group}$; and $\Delta_f$ is a time resource adjustment value determined according to a physical resource number.

With reference to the second possible implementation manner of the fourth aspect, in a third possible implementation manner, when $N_{group}$=1, f($n_{group}$)=0; or when $N_{group}$≥2, $$f(n_{group}) = \mod\left(\sum_{k=n_{group}\cdot M}^{n_{group}\cdot M+M-1} c(k)\times 2^{k-(n_{group}\cdot M)}, N_{group}\right) \text{ or}$$

$$f(n_{group}) = \sum_{k=n_{group}\cdot M}^{n_{group}\cdot M+M-1} c(k)\times 2^{k-(n_{group}\cdot M)},$$

where M is a positive integer that is not less than $\log_2^{N_{group}}$, and c(k) is a pseudo-random sequence.

With reference to the second possible implementation manner of the fourth aspect, in a fourth possible implementation manner, when $N_{group}$=1, f($n_{group}$)=0; or when $N_{group}$≥2, $$f(n_{group}) = \mod\left(f(n_{group}-1)+\sum_{k=n_{group}\cdot M}^{n_{group}\cdot M+M-1} c(k)\times 2^{k-(n_{group}\cdot M)}, N_{group}\right)$$

or $$f(n_{group}) = f(n_{group}-1) + \sum_{k=n_{group}\cdot M}^{n_{group}\cdot M+M-1} c(k)\times 2^{k-(n_{group}\cdot M)},$$

where M is a positive integer that is not less than $\log_2^{N_{group}}$, c(k) is a pseudo-random sequence, and f(−1)=0.

With reference to the fourth possible implementation manner of the fourth aspect, in a fifth possible implementation manner, when $N_{group}$>2, $$f(n_{group}) = \mod\left(f(n_{group}-1)+\right.$$

$$\left.\mod\left(\sum_{k=n_{group}\cdot M}^{n_{group}\cdot M+M-1} c(k)\times 2^{k-(n_{group}\cdot M)}, N_{group}-L\right)+L, N_{group}\right)$$

or $$f(n_{group}) =$$

$$f(n_{group}-1) + \mod\left(\sum_{k=n_{group}\cdot M}^{n_{group}\cdot M+M-1} c(k)\times 2^{k-(n_{group}\cdot M)}, N_{group}-L\right)+L,$$

where L is a positive integer and 1≤L≤$N_{group}$.

With reference to the fourth aspect, in a sixth possible implementation manner, the time resources occupied by the data signal in the N time resource groups have a same time resource number.

With reference to any one of the first to the fifth possible implementation manners of the fourth aspect, in a seventh possible implementation manner, $\Delta_f$=$\bar{f}_{RPT}$·$n_{group}$ or $\Delta_f$=(mod(f %$_{RPT}$,$N_{group}$−K)+K)·$n_{group}$, where f %$_{RPT}$ is a frequency resource number determined according to any one of the one or more physical resource numbers indicated by the indication signal, and is zero or a positive integer, and K is a positive integer and 1≤K<$N_{group}$.

With reference to the seventh possible implementation manner of the first aspect, in an eighth possible implementation manner, if any one of the one or more physical resource numbers indicated by the indication signal is p, n %$_{RPT}$=mod(p,$N_{group}$) and f %$_{RPT}$=floor (p/$N_{group}$), where floor( ) is a round-down function, and p is zero or a positive integer.

With reference to the seventh possible implementation manner of the first aspect, in a ninth possible implementation manner, if any one of the one or more physical resource numbers indicated by the indication signal includes a time resource number $x_{rpt}$ and a frequency resource number $f_{rpt}$, n %$_{RPT}$=$x_{rpt}$, and f %$_{RPT}$=$f_{rpt}$ or $\bar{f}_{RPT}$=$f_{rpt}$+Frequency_hopping($n_{group}$), where Frequency_hopping($n_{group}$) is a frequency resource adjustment value of the time resource group $n_{group}$, and $x_{rpt}$ and $f_{rpt}$ are zero or positive integers.

With reference to any one of the third to the fifth possible implementation manners of the first aspect, in a tenth possible implementation manner, an initialization sequence of the pseudo-random sequence c(k) is as follows: $c_{init}$=$N_{ID}^{cell}$, or $c_{init}$=510, or $c_{init}$=$2^9$·mod($n_f$, 4)+$N_{ID}^{cell}$, or $c_{init}$=$2^9$·mod($n_f$, 4)+510, where $N_{ID}^{cell}$ is a physical layer cell identifier, and $n_f$ is a system frame quantity.

With reference to any one of the fourth aspect, or the first to the tenth possible implementation manners of the fourth aspect, in an eleventh possible implementation manner, that the indication signal indicates a physical resource number of one or more physical resources includes: the indication signal includes a resource-pattern-of-transmission field, where the resource-pattern-of-transmission field is used to indicate the one or more physical resource numbers.

With reference to any one of the fourth aspect, or the first to the tenth possible implementation manners of the fourth aspect, in a twelfth implementation manner of the fourth aspect, the first obtaining unit is specifically configured to obtain the time resource grouping information according to a correspondence between a time resource number and a time resource, where the correspondence between a time resource number and a time resource is preset, or is fed back by a transmit end, or is provided by a third party, such as a base station.

With reference to any one of the fourth aspect, or the first to the tenth possible implementation manners of the fourth aspect, in a thirteenth implementation manner of the fourth aspect, the time resource grouping information is as follows: if the time resources such as 20 subframes are grouped into five groups, each time resource group includes k time resources, each time resource includes t frequency resources, and there are a total of k×t physical resources, where k and t are positive integers, in each time resource group, time resource numbers of the physical resources are 0, 1, . . . , k−1, frequency resource numbers of the physical resources are 0, 1, . . . , t−1, and physical resource numbers of the physical resources are 0, 1, . . . , k×t−1.

With reference to the fourth aspect, in a fourteenth possible implementation manner, the second obtaining unit is specifically configured to determine, according to a correspondence between time resource numbers occupied by the data signal in the N time resource groups and time resources, the time resources corresponding to the resource numbers, and obtain the data signal by using the time resources occupied by the data signal in the N time resource groups, where the correspondence between the time resource numbers occupied by the data signal in the N time resource groups and the time resources is preset, or is obtained from a transmit end, or is obtained from a third party, such as a base station.

With reference to the fourth aspect, in a fifteenth possible implementation manner of the fourth aspect, the receiving unit is specifically configured to receive a correspondence between a time resource number and a time resource.

With reference to the eleventh possible implementation manner of the fourth aspect, in a sixteenth possible implementation manner, the indication signal includes one re source-pattern-of-transmission field, where the re source-pattern-of-transmission field is used to indicate a time resource number and a frequency resource number of the one or more physical resources.

With reference to the eleventh possible implementation manner of the fourth aspect, in a seventeenth possible implementation manner, the indication signal includes two re source-pattern-of-transmission fields, where one resource-pattern-of-transmission field is used to indicate a time resource number of the one or more physical resources, and the other resource-pattern-of-transmission field is used to indicate a frequency resource number of the one or more physical resources.

Based on the foregoing technical solutions, in the embodiments of the present invention, first user equipment may obtain time resource grouping information, where the time resource grouping information includes physical resource numbers of physical resources in N time resource groups, and N is a positive integer; the first user equipment sends an indication signal, where the indication signal indicates one or more physical resource numbers; the first user equipment determines, according to the time resource grouping information and the one or more physical resource numbers indicated by the indication signal, time resources occupied by a data signal in the N time resource groups; and the first user equipment sends the data signal by using the time resources occupied by the data signal in the N time resource groups. In this way, a time resource that carries a data signal can be accurately indicated, which reduces processing time and electric energy consumption of a receive end, and improves network performance.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic flowchart of a data transmission method according to an embodiment of the present invention;

FIG. 2 is a schematic flowchart of a data transmission method according to another embodiment of the present invention;

FIG. 3 is a schematic block diagram of user equipment according to an embodiment of the present invention;

DESCRIPTION OF EMBODIMENTS

Figure 4:
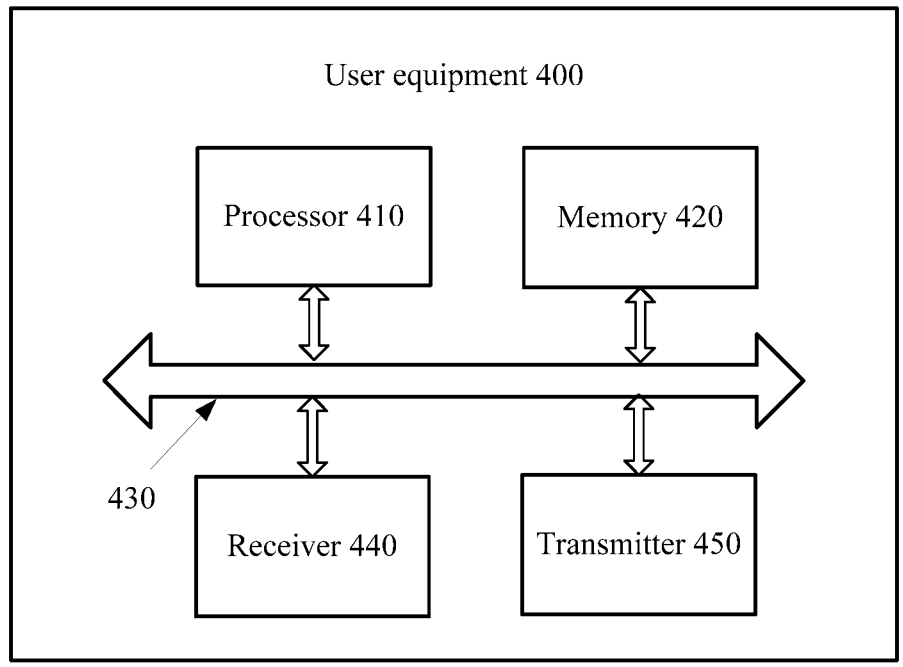
FIG. 4 is a schematic block diagram of user equipment according to another embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as a Global System for Mobile Communications (Global System of Mobile communication, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, LTE time division duplex (Time Division Duplex, TDD), a Universal Mobile Telecommunication System (Universal Mobile Telecommunication System, UMTS), or a Worldwide Interoperability for Microwave Access (Worldwide Interoperability for Microwave Access, WiMAX) communications system.

It should be understood that, in the embodiments of the present invention, user equipment (User Equipment, UE for short) includes but is not limited to a mobile station (Mobile Station, MS for short), a mobile terminal (Mobile Terminal), a mobile telephone (Mobile Telephone), a handset (handset), portable equipment (portable equipment), or the like. The user equipment may communicate with one or more core networks by using a radio access network (Radio Access Network, RAN for short). For example, the user equipment may be a mobile telephone (or referred to as a "cellular" phone), or a computer having a wireless communication function; or the user equipment may be a portable, pocket-sized, handheld, computer built-in, or in-vehicle mobile apparatus.

It should be understood that, the user equipment in the technical solutions of the present invention has a D2D communication function, that is, two user equipments may perform D2D communication with each other.

It should further be understood that, first user equipment and second user equipment in the embodiments of the present invention are only for ease of description, and are not limited.

In the embodiments of the present invention, a base station may be a base transceiver station (Base Transceiver Station, BTS for short) in GSM or CDMA, or may be a NodeB (NodeB) in WCDMA, or may be an evolved NodeB (evolved NodeB, eNB or e-NodeB for short) in LTE, or may be a cluster head (cluster head) of a user cluster in D2D communication. This is not limited in the embodiments of the present invention.

FIG. 1 shows a data transmission method 100. The method 100 may be executed, for example, by user equipment. As shown in FIG. 1, the method 100 includes the following steps.

S110. First user equipment obtains time resource grouping information, where the time resource grouping information includes physical resource numbers of physical resources in N time resource groups, and N is a positive integer.

It should be understood that, quantities of time resource numbers in the N time resource groups may be the same or different, and the time resource grouping information may be sent by a third party, such as a base station or a receive end, or may be preset in the user equipment. This is not limited in this embodiment of the present invention.

It should be noted that, the physical resource may be a resource element (Resource Element, RE for short) or a physical resource block (Physical Resource Block, PRB for short), the frequency resource may be a carrier or a subcarrier, and the time resource may be a subframe, a timeslot, or the like. In D2D communication, for example, in a VoIP (Voice over Internet Protocol) voice service, a data transmission model is that 44 bytes (bytes) that are a total of 352-bit (bit) information are transmitted within 20 milliseconds (ms), that is, in 20 subframes. The 352-bit information includes 328-bit valid payload (payload) information and 24-bit cyclic redundancy check (Cyclic Redundancy Check, CRC for short) information. To ensure coverage of the VoIP voice service, a VoIP data packet needs to be transmitted multiple times within a period of 20 ms, for example, five times. That is, the VoIP data packet needs to be sent by occupying multiple subframes of the 20 subframes.

resource numbers are 0, 1, . . . , 3, frequency resource numbers are 0, 1, . . . , 4, and physical resource numbers are 0, 1, . . . , 19. That is, in the 20 subframes, the VoIP data packet may be sent by using any one subframe in each time resource group, that is, a total of five subframes. In this way, the coverage of the VoIP voice service is ensured.

S120. The first user equipment sends an indication signal, such as a scheduling assignment signal (Scheduling Assignment, SA for short), where the indication signal indicates one or more physical resource numbers.

Specifically, the first user equipment may send the indication signal according to scheduling information of a base station. This is not limited in this embodiment of the present invention. For example, the first user equipment may send the indication signal according to a feedback of a receive end, or may send the indication signal according to a preset configuration.

S130. The first user equipment determines, according to the time resource grouping information and the one or more physical resource numbers indicated by the indication signal, time resources (that is, time resource numbers) occupied by a data signal in the N time resource groups, where, for example, the data signal occupies only one time resource number in each time resource group.

It should be understood that, the first user equipment may determine, by using multiple methods, the time resources (that is, the time resource numbers occupied by the data signal in the N time resource groups) occupied by the data signal in the N time resource groups. The data signal may occupy one or more time resource numbers in each time resource group. This is not limited in this embodiment of the present invention.

S140. The first user equipment sends the data signal by using the time resources (that is, time resources corresponding to the time resource numbers) occupied by the data signal in the N time resource groups.

It should be understood that, the first user equipment may send the data signal by using multiple methods, for example, the first user equipment simultaneously or sequentially uses the time resources occupied by the data signal in the N time resource groups. This is not limited in this embodiment of the present invention.

It should be understood that, sequence numbers of the foregoing processes do not mean execution sequences in

TABLE 1

| | | Time resource (for example, 20 subframes) | | | | | | | | | | | | | | | | | | | |
|---|---|---|---|---|---|---|---|---|---|---|---|---|---|---|---|---|---|---|---|---|---|
| Time resource group sequence number | | 0 | | | | 1 | | | | 2 | | | | 3 | | | | 4 | | | |
| Time resource number | | 0 | 1 | 2 | 3 | 0 | 1 | 2 | 3 | 0 | 1 | 2 | 3 | 0 | 1 | 2 | 3 | 0 | 1 | 2 | 3 |
| Frequency resource number | 0 | 0 | 1 | 2 | 3 | 0 | 1 | 2 | 3 | 0 | 1 | 2 | 3 | 0 | 1 | 2 | 3 | 0 | 1 | 2 | 3 |
| | 1 | 4 | 5 | 6 | 7 | 4 | 5 | 6 | 7 | 4 | 5 | 6 | 7 | 4 | 5 | 6 | 7 | 4 | 5 | 6 | 7 |
| | 2 | 8 | 9 | 10 | 11 | 8 | 9 | 10 | 11 | 8 | 9 | 10 | 11 | 8 | 9 | 10 | 11 | 8 | 9 | 10 | 11 |
| | 3 | 12 | 13 | 14 | 15 | 12 | 13 | 14 | 15 | 12 | 13 | 14 | 15 | 12 | 13 | 14 | 15 | 12 | 13 | 14 | 15 |
| | 4 | 16 | 17 | 18 | 19 | 16 | 17 | 18 | 19 | 16 | 17 | 18 | 19 | 16 | 17 | 18 | 19 | 16 | 17 | 18 | 19 |

Referring to Table 1, in this step, if the first user equipment may group time resources, such as 20 subframes, used for transmitting a data signal into five groups. Each time resource group includes four subframes, each subframe includes five frequency resources, and there are a total of 20 physical resources. In each time resource group, time various embodiments of the present invention. The execution sequences of the processes should be determined according to functions and internal logic of the processes, and should not be construed as any limitation on the implementation processes of the embodiments of the present invention.

With reference to FIG. 1, from a perspective of the first user equipment, the foregoing describes in detail the data transmission method according to this embodiment of the present invention.

The following further describes this embodiment of the present invention in detail with reference to a specific example. It should be noted that, the example in FIG. 1 is intended only to help a person skilled in the art understand this embodiment of the present invention, but is not intended to limit this embodiment of the present invention to a specific value or a specific scenario that is illustrated. Apparently, a person skilled in the art can make various equivalent modifications or changes according to the example given in FIG. 1, and such modifications or changes also fall within the scope of this embodiment of the present invention.

According to this embodiment of the present invention, that the indication signal indicates one or more physical resource numbers includes: the indication signal includes a resource-pattern-of-transmission (Resource Pattern of Transmission, RPT for short) field, where the resource-pattern-of-transmission field is used to indicate the one or more physical resource numbers.

Specifically, referring to Table 1, for example, two bits 00 of the RPT field indicate a physical resource number 0. Two bits 01 of the RPT field indicate a physical resource number 1. Two bits 10 of the RPT field indicate a physical resource number 2. Two bits 11 of the RPT field indicate a physical resource number 3. More bits of the RPT field may further be used to represent other physical resource numbers. This is not limited in this embodiment of the present invention.

Optionally, the time resources occupied by the data signal in the N time resource groups have a same time resource number.

Specifically, referring to Table 1, if the data signal is sent by using time resources whose time resource numbers are all 0 in the five time resource groups, such a fixed time resource interval is unfavorable to randomization of interference between cells. For example, if two user equipments in two cells both send data signals by using time resources corresponding to the time resource number 0, the data signals of the two user equipments constantly collide with each other.

To resolve the problem in the foregoing embodiment, another embodiment is put forward. That the first user equipment determines, according to the time resource grouping information and the one or more physical resource numbers indicated by the indication signal, time resources occupied by the data signal in the N time resource groups includes: the first user equipment determines, according to formula (1), a time resource number n % ($n_{group}$) occupied by the data signal in a time resource group $n_{group}$:

$$n\%_{subframe}(n_{group}) = \mod(n\%_{RPT} + \Delta_f, N_{group}) \quad (1),$$

where mod( ) is a mod function; $n_{group}$ is a time resource group sequence number, and is zero or a positive integer; n $\%_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer, for example, $N_{group}$ shown in Table 1 is 4; and $\Delta_f$ is a time resource adjustment value determined according to a physical resource number.

It should be understood that, the time resource adjustment value Δf may be a random number or any value determined in another manner. This is not limited in this embodiment of the present invention.

Optionally, $\Delta_f$ may be determined according to formula (1a) or (1b):

$$\Delta_f = f_{RPT} \cdot n_{group} \quad (1a), \text{ or}$$

$$\Delta_f = (\mod(f\%_{RPT}, N_{group} - K) + K) \cdot n_{group} \quad (1b),$$

where f $\%_{RPT}$ is a frequency resource number determined according to any one of the one or more physical resource numbers indicated by the indication signal, and is zero or a positive integer, and K is a positive integer and $1 \leq K < N_{group}$.

Optionally, that the first user equipment determines, according to the time resource grouping information and the one or more physical resource numbers indicated by the indication signal, time resources occupied by the data signal in the N time resource groups includes: the first user equipment determines, according to formula (2), a time resource number n % ($n_{group}$) occupied by the data signal in a time resource group $n_{group}$:

$$n\%_{subframe}(n_{group}) = \mod(n\%_{RPT} + \Delta_f + f_{hop}(n_{group}), N_{group}) \quad (2),$$

where mod( ) is a mod function; $n_{group}$ is a time resource group sequence number, and is zero or a positive integer; n $\%_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer; $f(n_{group})$ is a time resource adjustment value of the time resource group $n_{group}$; and $\Delta_f$ is a time resource adjustment value determined according to a physical resource number, for example, Δf may be determined according to formula (1a) or (1b).

It should be understood that, the time resource adjustment value Δf or $f(n_{group})$ may be a random number or any value determined in another manner. This is not limited in this embodiment of the present invention.

Optionally, when $N_{group}=1$, $f(n_{group})=0$; or when $N_{group} \geq 2$, $$f(n_{group}) = \mod\left(\sum_{k=n_{group} \cdot M}^{n_{group} \cdot M + M - 1} c(k) \times 2^{k - (n_{group} \cdot M)}, N_{group}\right), \text{ or} \quad (2a)$$

$$f(n_{group}) = \sum_{k=n_{group} \cdot M}^{n_{group} \cdot M + M - 1} c(k) \times 2^{k - (n_{group} \cdot M)}, \quad (2b)$$

where

M is a positive integer that is not less than $\log_2^{N_{group}}$, for example, M shown in Table 1 is 2, and c(k) is a pseudo-random sequence.

Optionally when $N_{group}=1$, $f(n_{group})=0$; or when $N_{group} \geq 2$, $$f(n_{group}) = \quad (3a)$$

$$\mod\left(f(n_{group} - 1) + \sum_{k=n_{group} \cdot M}^{n_{group} \cdot M + M - 1} c(k) \times 2^{k - (n_{group} \cdot M)}, N_{group}\right),$$

or

-continued $$f(n_{group}) = f(n_{group} - 1) + \sum_{k=n_{group} \cdot M}^{n_{group} \cdot M+M-1} c(k) \times 2^{k-(n_{group} \cdot M)}, \quad (3b)$$

where

M is a positive integer that is not less than $\log_2^{N_{group}}$, for example, M shown in Table 1 is 2, c(k) is a pseudo-random sequence, and f(−1)=0.

Optionally, when $N_{group}$=1, $f(n_{group})$=0; when $N_{group}$=2, the time resource adjustment value $f(n_{group})$ is determined according to formula (3a) or (3b); or when $N_{group}$>2, $$f(n_{group}) = \quad (4a)$$
$$\mod\left(f(n_{group} - 1) + \mod\left(\sum_{k=n_{group} \cdot M}^{n_{group} \cdot M+M-1} c(k) \times 2^{k-(n_{group} \cdot M)}, N_{group} - L\right) + L, N_{group}\right),$$

or $$f(n_{group}) = f(n_{group} - 1) + \quad (4b)$$
$$\mod\left(\sum_{k=n_{group} \cdot M}^{n_{group} \cdot M+M-1} c(k) \times 2^{k-(n_{group} \cdot M)}, N_{group} - L\right) + L,$$

where

M is a positive integer that is not less than $\log_2^{N_{group}}$, for example, M shown in Table 1 is 2, c(k) is a pseudo-random sequence, f(−1)=0, and L is a positive integer and $1 \leq L < N_{group}$.

It should be noted that, a pseudo-random sequence c(n) is a Gold sequence with a length of 31, that is, an output sequence with a length of $M_{PN}$, where n=0, 1, L, $M_{PN}$−1, and is defined by using the following formulas:

$$c(n) = \mod(x_1(n+N_C) + x_2(n+N_C), 2)$$

$$x_1(n+31) = \mod(x_1(n+3) + x_1(n), 2)$$

$$x_2(n+31) = \mod(x_2(n+3) + x_2(n+2) + x_2(n+1) + x_2(n), 2) \quad (5),$$

where $N_C$=1600, the first sequence is initialized by using $x_1(0)$=1, $x_1(n)$=0, n=1, 2, . . . , 30, and the second sequence is initialized by using $$c_{init} = \sum_{i=0}^{30} x_2(i) \cdot 2^i.$$

In addition, in the foregoing embodiment, referring to Table 1, if the data signal is sent by using time resources whose time resource numbers are different in the five time resource groups, such an unfixed time resource interval is favorable to randomization of interference between cells.

Optionally, if any one of the one or more physical resource numbers indicated by the indication signal is p, n $\%_{RPT}$=mod(p,$N_{group}$) and f $\%_{RPT}$=floor(p/$N_{group}$), where floor( ) is a round-down function, and p is zero or a positive integer.

Optionally, if any one of the one or more physical resource numbers indicated by the indication signal includes a time resource number $x_{rpt}$ and a frequency resource number $f_{rpt}$, n $\%_{RPT}$=$x_{rpt}$, and f $\%_{RPT}$=$f_{rpt}$ or $\tilde{f}_{RPT}$=$f_{rpt}$+Frequency_hopping($n_{group}$), where Frequency_hopping($n_{group}$) is a frequency resource adjustment value of the time resource group $n_{group}$, and $x_{rpt}$ and $f_{rpt}$ are zero or positive integers.

It should be understood that, the frequency resource adjustment value Frequency_hopping($n_{group}$) may be a random number or any value determined in another manner. This is not limited in this embodiment of the present invention.

Optionally, an initialization sequence of the pseudo-random sequence c(k) is as follows: $c_{init}$=$N_{ID}^{cell}$, or $c_{init}$=510, or $c_{init}$=$2^9 \cdot \mod(n_f, 4)$+$N_{ID}^{cell}$, or $c_{init}$=$2^9 \cdot \mod(n_f, 4)$+510, where $N_{ID}^{cell}$ is a physical layer cell identifier, and $n_f$ is a system frame quantity.

Optionally, that first user equipment obtains time resource grouping information includes: the first user equipment obtains the time resource grouping information according to a correspondence between a time resource number and a time resource, where the correspondence between a time resource number and a time resource is preset, or is fed back by a receive end, or is provided by a third party, such as a base station.

Optionally, the time resource grouping information is as follows: if the time resources such as 20 subframes are grouped into five groups, each time resource group includes k time resources, each time resource includes t frequency resources, and there are a total of k×t physical resources, where k and t are positive integers, in each time resource group, time resource numbers of the physical resources are 0, 1, . . . , k−1, frequency resource numbers of the physical resources are 0, 1, . . . , t−1, and physical resource numbers of the physical resources are 0, 1, . . . , k×t−1.

Optionally, the indication signal includes one resource-pattern-of-transmission field, where the resource-pattern-of-transmission field is used to indicate a time resource number and a frequency resource number of the one or more physical resources.

Optionally, the indication signal includes two resource-pattern-of-transmission fields, where one resource-pattern-of-transmission field is used to indicate a time resource number of the one or more physical resources, and the other resource-pattern-of-transmission field is used to indicate a frequency resource number of the one or more physical resources.

It should be understood that, the resource-pattern-of-transmission field may be used, in multiple manners, to indicate a physical resource number or a time resource number and a frequency resource number that are included in the physical resource number. This is not limited in this embodiment of the present invention.

Therefore, in this embodiment of the present invention, because a time resource that carries a data signal can be accurately indicated, a receive end can receive the data signal without a need to perform blind detection, which reduces processing time and energy consumption of the receive end.

With reference to FIG. 1, from a perspective of user equipment at a transmit end, the foregoing describes in detail a data transmission method according to an embodiment of the present invention. With reference to FIG. 2, from a perspective of user equipment at a receive end, the following describes a data transmission method according to an embodiment of the present invention. FIG. 2 illustrates the data transmission method from the perspective of the user equipment used as the receive end. It should be noted that, the user equipment may be a transmit end, or may be a receive end.

FIG. 2 shows another data transmission method 200 according to an embodiment of the present invention, and the method 200 includes the following steps.

S210. Second user equipment obtains time resource grouping information, where the time resource grouping information includes physical resource numbers of physical resources in N time resource groups, and N is a positive integer.

Specifically, quantities of time resource numbers in the N time resource groups may be the same or different, and the time resource grouping information may be sent by a third party, such as a base station or a transmit end, or may be preset in the user equipment. This is not limited in this embodiment of the present invention. For example, the second user equipment may obtain the time resource grouping information and the physical resource numbers in each time resource group that are shown in Table 1.

S220. The second user equipment receives an indication signal, such as a scheduling assignment signal (Scheduling Assignment, SA for short), where the indication signal indicates one or more physical resource numbers.

Specifically, the second user equipment may receive the indication signal according to scheduling information of a base station. This is not limited in this embodiment of the present invention. For example, the second user equipment may receive the indication signal according to an indication of a transmit end, or may receive the indication signal according to a preset configuration.

S230. The second user equipment determines, according to the time resource grouping information and the one or more physical resource numbers indicated by the indication signal, time resources (for example, time resource numbers) occupied by a data signal in the N time resource groups, where, for example, the data signal occupies only one time resource number in each time resource group.

It should be understood that, the second user equipment may obtain, by using multiple methods, the time resources (that is, the time resource numbers) occupied by the data signal in the N time resource groups. The data signal may occupy one or more time resource numbers in each time resource group. This is not limited in this embodiment of the present invention.

S240. The second user equipment obtains the data signal according to the time resources (that is, time resources corresponding to the time resource numbers) occupied by the data signal in the N time resource groups.

It should be understood that, the second user equipment may obtain the data signal by using multiple methods, for example, the second user equipment simultaneously or sequentially obtains the time resources occupied by the data signal in the N time resource groups. This is not limited in this embodiment of the present invention.

With reference to FIG. 2, from a perspective of the second user equipment, the foregoing describes in detail the data transmission method according to this embodiment of the present invention.

The following further describes this embodiment of the present invention in detail with reference to a specific example. It should be noted that, the example in FIG. 2 is intended only to help a person skilled in the art understand this embodiment of the present invention, but is not intended to limit this embodiment of the present invention to a specific value or a specific scenario that is illustrated. Apparently, a person skilled in the art can make various equivalent modifications or changes according to the example given in FIG. 2, and such modifications or changes also fall within the scope of this embodiment of the present invention.

According to this embodiment of the present invention, that the indication signal indicates one or more physical resource numbers includes: the indication signal includes a resource-pattern-of-transmission (Resource Pattern of Transmission, RPT for short) field, where the resource-pattern-of-transmission field is used to indicate the one or more physical resource numbers.

Specifically, referring to Table 1, for example, two bits 00 of the RPT field indicate a physical resource number 0. Two bits 01 of the RPT field indicate a physical resource number 1. Two bits 10 of the RPT field indicate a physical resource number 2. Two bits 11 of the RPT field indicate a physical resource number 3. More bits of the RPT field may further be used to represent other physical resource numbers. This is not limited in this embodiment of the present invention.

Optionally, the time resources occupied by the data signal in the N time resource groups have a same time resource number.

Specifically, referring to Table 1, if the data signal is sent by using time resources whose time resource numbers are all 0 in the five time resource groups, such a fixed time resource interval is unfavorable to randomization of interference between cells. For example, if two user equipments in two cells both send data signals by using time resources corresponding to the time resource number 0, the data signals of the two user equipments constantly collide with each other.

To resolve the problem in the foregoing embodiment, another embodiment is put forward. That the second user equipment determines, according to the time resource grouping information and the one or more physical resource numbers indicated by the indication signal, time resources occupied by the data signal in the N time resource groups includes: the second user equipment determines, according to formula (1), a time resource number n % ($n_{group}$) occupied by the data signal in a time resource group $n_{group}$.

Optionally, that the second user equipment determines, according to the time resource grouping information and the one or more physical resource numbers indicated by the indication signal, time resources occupied by the data signal in the N time resource groups includes: the second user equipment determines, according to formula (2), a time resource number n % ($n_{group}$) occupied by the data signal in a time resource group $n_{group}$.

Optionally, $\Delta_f$ may be determined according to formula (1a) or (1b).

Optionally, when $N_{group}=1$, $f(n_{group})=0$; or when $N_{group} \geq 2$, the time resource adjustment value $f(n_{group})$ is determined according to formula (2a) or (2b).

Optionally, when $N_{group}=1$, $f(n_{group})=0$; or when $N_{group} \geq 2$, the time resource adjustment value $f(n_{group})$ is determined according to formula (3a) or (3b).

Optionally, when $N_{group}=1$, $f(n_{group})=0$; or when $N_{group}=2$, the time resource adjustment value $f(n_{group})$ is determined according to formula (3a) or (3b); or when $N_{group}>2$, the time resource adjustment value $f(n_{group})$ is determined according to formula (4a) or (4b).

In addition, in the foregoing embodiment, referring to Table 1, if the data signal is sent by using time resources whose time resource numbers are different in the five time resource groups, such an unfixed time resource interval is favorable to randomization of interference between cells.

Optionally, if any one of the one or more physical resource numbers indicated by the indication signal is p, n %$_{RPT}$=mod(p,N$_{group}$) and f %$_{RPT}$=floor(p,N$_{group}$), where floor( ) is a round-down function, and p is zero or a positive integer.

Optionally, if any one of the one or more physical resource numbers indicated by the indication signal includes a time resource number x$_{rpt}$ and a frequency resource number f$_{rpt}$, n %$_{RPT}$=x$_{rpt}$, and f %$_{RPT}$=f$_{rpt}$ or f̂$_{RPT}$=f$_{rpt}$+Frequency_hopping(n$_{group}$), where Frequency_hopping(n$_{group}$) is a frequency resource adjustment value of the time resource group n$_{group}$, and x$_{rpt}$ and f$_{rpt}$ are zero or positive integers.

It should be understood that, the frequency resource adjustment value Frequency_hopping(n$_{group}$) may be a random number or any value determined in another manner. This is not limited in this embodiment of the present invention.

Optionally, an initialization sequence of the pseudo-random sequence c(k) is as follows: c$_{init}$=N$_{ID}^{cell}$, or c$_{init}$=510, or c$_{init}$=2$^9$·mod(n$_f$, 4)+N$_{ID}^{cell}$, or c$_{init}$=2$^9$·mod(n$_f$, 4)+510, where N$_{ID}^{cell}$ is a physical layer cell identifier, and n$_f$ is a system frame quantity.

Optionally, that second user equipment obtains time resource grouping information includes: the second user equipment obtains the time resource grouping information according to a correspondence between a time resource number and a time resource, where the correspondence between a time resource number and a time resource is preset, or is fed back by a transmit end, or is provided by a third party, such as a base station.

Optionally, the time resource grouping information is as follows: if the time resources such as 20 subframes are grouped into five groups, each time resource group includes k time resources, each time resource includes t frequency resources, and there are a total of k×t physical resources, where k and t are positive integers, in each time resource group, time resource numbers of the physical resources are 0, 1, . . . , k−1, frequency resource numbers of the physical resources are 0, 1, . . . , t−1, and physical resource numbers of the physical resources are 0, 1, . . . , k×t−1.

Optionally, the indication signal includes one resource-pattern-of-transmission field, where the resource-pattern-of-transmission field is used to indicate a time resource number and a frequency resource number of the one or more physical resources.

Optionally, the indication signal includes two resource-pattern-of-transmission fields, where one resource-pattern-of-transmission field is used to indicate a time resource number of the one or more physical resources, and the other resource-pattern-of-transmission field is used to indicate a frequency resource number of the one or more physical resources.

It should be understood that, the resource-pattern-of-transmission field may be used, in multiple manners, to indicate a physical resource number or a time resource number and a frequency resource number that are included in the physical resource number. This is not limited in this embodiment of the present invention.

According to this embodiment of the present invention, that the second user equipment obtains the data signal by using the time resources occupied by the data signal in the N time resource groups includes: the second user equipment determines, according to a correspondence between the time resource numbers occupied by the data signal in the N time resource groups and the time resources, the time resources corresponding to the resource numbers, and obtains the data signal by using the time resources occupied by the data signal in the N time resource groups, where the correspondence between the time resource numbers occupied by the data signal in the N time resource groups and the time resources is preset, or is obtained from a transmit end, or is obtained from a third party.

Optionally, the method further includes: receiving, by the second user equipment, a correspondence between a time resource number and a time resource.

In this embodiment of the present invention, because a time resource that carries a data signal can be accurately indicated, second user equipment can receive the data signal without a need to perform blind detection, which reduces processing time and electric energy consumption of a receive end.

With reference to FIG. 1 to FIG. 2, the foregoing describes in detail a data transmission method according to the embodiments of the present invention. With reference to FIG. 3 to FIG. 6, the following describes in detail user equipment according to the embodiments of the present invention.

FIG. 3 is a schematic block diagram of user equipment 300 according to an embodiment of the present invention. As shown in FIG. 3, the user equipment 300 includes an obtaining unit 310, a first sending unit 320, a determining unit 330, and a second sending unit 340.

The obtaining unit 310 is configured to obtain time resource grouping information, where the time resource grouping information includes physical resource numbers of physical resources in N time resource groups, and N is a positive integer.

Specifically, quantities of time resource numbers in the N time resource groups may be the same or different, and the obtaining unit 310 may obtain the time resource grouping information and the physical resource numbers of the physical resources in the N time resource groups that are shown in Table 1. The time resource grouping information may be sent by a third party, such as a base station or a receive end, or may be preset in the user equipment. This is not limited in this embodiment of the present invention.

The first sending unit 320 is configured to send an indication signal, such as a scheduling assignment signal (Scheduling Assignment, SA for short), where the indication signal indicates one or more physical resource numbers.

Specifically, the first sending unit 320 may send the indication signal according to scheduling information of a base station. This is not limited in this embodiment of the present invention. For example, the first sending unit 320 may send the indication signal according to a feedback of a receive end, or may send the indication signal according to a preset configuration.

The determining unit 330 is configured to determine, according to the time resource grouping information and the one or more physical resource numbers indicated by the indication signal, time resources (that is, time resource numbers) occupied by a data signal in the N time resource groups, where, for example, the data signal occupies only one time resource number in each time resource group.

The second sending unit 340 is configured to send the data signal by using the time resources (that is, time resources corresponding to the time resource numbers) occupied by the data signal in the N time resource groups.

It should be understood that, the second sending unit 340 may send the data signal by using multiple methods, for example, the second sending unit 340 simultaneously or sequentially uses the time resources occupied by the data signal in the N time resource groups. This is not limited in this embodiment of the present invention.

With reference to FIG. 3, the foregoing describes in detail the user equipment 300 according to this embodiment of the present invention.

The following further describes this embodiment of the present invention in detail with reference to a specific example. It should be noted that, the example in FIG. 3 is intended only to help a person skilled in the art understand this embodiment of the present invention, but is not intended to limit this embodiment of the present invention to a specific value or a specific scenario that is illustrated. Apparently, a person skilled in the art can make various equivalent modifications or changes according to the example given in FIG. 3, and such modifications or changes also fall within the scope of this embodiment of the present invention.

According to this embodiment of the present invention, that the indication signal indicates one or more physical resource numbers includes: the indication signal includes a resource-pattern-of-transmission (Resource Pattern of Transmission, RPT for short) field, where the resource-pattern-of-transmission field is used to indicate the one or more physical resource numbers.

Specifically, referring to Table 1, for example, two bits 00 of the RPT field indicate a physical resource number 0. Two bits 01 of the RPT field indicate a physical resource number 1. Two bits 10 of the RPT field indicate a physical resource number 2. Two bits 11 of the RPT field indicate a physical resource number 3. More bits of the RPT field may further be used to represent other physical resource numbers. This is not limited in this embodiment of the present invention.

Optionally, the time resources occupied by the data signal in the N time resource groups have a same time resource number.

Specifically, referring to Table 1, if the data signal is sent by using time resources whose time resource numbers are all 0 in the five time resource groups, such a fixed time resource interval is unfavorable to randomization of interference between cells. For example, if two user equipments in two cells both send data signals by using time resources corresponding to the time resource number 0, the data signals of the two user equipments constantly collide with each other.

To resolve the problem in the foregoing embodiment, another embodiment is put forward. The determining unit 330 is specifically configured to determine, according to formula (1), a time resource number n % ($n_{group}$) occupied by the data signal in a time resource group $n_{group}$.

Optionally, the determining unit 330 is specifically configured to determine, according to formula (2), a time resource number n % ($n_{group}$) occupied by the data signal in a time resource group $n_{group}$.

It should be understood that, the time resource adjustment value f($n_{group}$) may be a random number or any value determined in another manner. This is not limited in this embodiment of the present invention.

Optionally, when $N_{group}=1$, f($n_{group}$)=0; when $N_{group} \geq 2$, the time resource adjustment value f($n_{group}$) is determined according to formula (2a) or (2b).

Optionally, when $N_{group}=1$, f($n_{group}$)=0; when $N_{group} \geq 2$, the time resource adjustment value f($n_{group}$) is determined according to formula (3a) or (3b).

Optionally, when $N_{group}=1$, f($n_{group}$)=0; when $N_{group}=2$, the time resource adjustment value f($n_{group}$) is determined according to formula (3a) or (3b); or when $N_{group}>2$, the time resource adjustment value f($n_{group}$) is determined according to formula (4a) or (4b).

In addition, in the foregoing embodiment, referring to Table 1, if the data signal is sent by using time resources whose time resource numbers are different in the five time resource groups, such an unfixed time resource interval is favorable to randomization of interference between cells.

Optionally, $\Delta_f = \tilde{f}_{RPT} \cdot n_{group}$ or $\Delta_f = (\text{mod}(f \%_{RPT}, N_{group} - K) + K) \cdot n_{group}$, where f $\%_{RPT}$ is a frequency resource number determined according to any one of the one or more physical resource numbers indicated by the indication signal, and is zero or a positive integer, and K is a positive integer and $1 \leq K < N_{group}$.

Optionally, if any one of the one or more physical resource numbers indicated by the indication signal is p, n $\%_{RPT}=\text{mod}(p, N_{group})$ and f $\%_{RPT}=\text{floor}(p/N_{group})$, where floor( ) is a round-down function, and p is zero or a positive integer.

Optionally, if any one of the one or more physical resource numbers indicated by the indication signal includes a time resource number $x_{rpt}$ and a frequency resource number $f_{rpt}$, n $\%_{RPT}=x_{rpt}$, and f $\%_{RPT}=f_{rpt}$ or $\tilde{f}_{RPT}=f_{rpt}+\text{Frequency\_hopping}(n_{group})$, where Frequency\_hopping($n_{group}$) is a frequency resource adjustment value of the time resource group $n_{group}$, and $x_{rpt}$ and $f_{rpt}$ are zero or positive integers.

It should be understood that, the frequency resource adjustment value Frequency\_hopping($n_{group}$) may be a random number or any value determined in another manner. This is not limited in this embodiment of the present invention.

Optionally, an initialization sequence of the pseudo-random sequence c(k) is as follows: $c_{init}=N_{ID}^{cell}$, or $c_{init}=510$, or $c_{init}=2^9 \cdot \text{mod}(n_f, 4)+N_{ID}^{cell}$, or $c_{init}=2^9 \cdot \text{mod}(n_f, 4)+510$, where $N_{ID}^{cell}$ is a physical layer cell identifier, and $n_f$ is a system frame quantity.

Optionally, the obtaining unit 310 is specifically configured to obtain the time resource grouping information according to a correspondence between a time resource number and a time resource, where the correspondence between a time resource number and a time resource is preset, or is fed back by a receive end, or is provided by a third party, such as a base station.

Optionally, the time resource grouping information is as follows: if the time resources such as 20 subframes are grouped into five groups, each time resource group includes k time resources, each time resource includes t frequency resources, and there are a total of k×t physical resources, where k and t are positive integers, in each time resource group, time resource numbers of the physical resources are 0, 1, . . . , k−1, frequency resource numbers of the physical resources are 0, 1, . . . , t−1, and physical resource numbers of the physical resources are 0, 1, . . . , k×t−1.

Optionally, the indication signal includes one resource-pattern-of-transmission field, where the resource-pattern-of-transmission field is used to indicate a time resource number and a frequency resource number of the one or more physical resources.

Optionally, the indication signal includes two resource-pattern-of-transmission fields, where one resource-pattern-of-transmission field is used to indicate a time resource number of the one or more physical resources, and the other resource-pattern-of-transmission field is used to indicate a frequency resource number of the one or more physical resources.

It should be understood that, the resource-pattern-of-transmission field may be used, in multiple manners, to indicate a physical resource number or a time resource number and a frequency resource number that are included in the physical resource number. This is not limited in this embodiment of the present invention.

Therefore, in this embodiment of the present invention, because a time resource that carries a data signal can be accurately indicated, a receive end can receive the data signal without a need to perform blind detection, which reduces processing time and energy consumption of the receive end.

In another implementation manner, as shown in FIG. 4, an embodiment of the present invention further provides user equipment 400. The user equipment 400 includes a processor 410, a memory 420, a bus system 430, a receiver 440, and a transmitter 450. The processor 410, the memory 420, the receiver 440, and the transmitter 450 are connected by using the bus system 430. The memory 420 is configured to store an instruction. The processor 410 is configured to execute the instruction stored in the memory 420, to control the receiver 440 to receive a signal, an instruction, or a message, and control the transmitter 450 to send a signal, an instruction, or a message. The processor 410 is configured to: obtain time resource grouping information, where the time resource grouping information includes physical resource numbers of physical resources in N time resource groups, and N is a positive integer; and determine, according to the time resource grouping information and one or more physical resource numbers indicated by an indication signal sent by the transmitter 450, time resources (that is, time resource numbers) occupied by a data signal in the N time resource groups, where, for example, the data signal occupies only one time resource number in each time resource group. The transmitter 450 is configured to: send the indication signal, such as a scheduling assignment signal (Scheduling Assignment, SA for short), where the indication signal indicates the one or more physical resource numbers; and send the data signal by using the time resources (that is, time resources corresponding to the time resource numbers) occupied by the data signal in the N time resource groups.

With reference to FIG. 4, the foregoing describes in detail the user equipment 400 according to this embodiment of the present invention.

The following further describes this embodiment of the present invention in detail with reference to a specific example. It should be noted that, the example in FIG. 4 is intended only to help a person skilled in the art understand this embodiment of the present invention, but is not intended to limit this embodiment of the present invention to a specific value or a specific scenario that is illustrated. Apparently, a person skilled in the art can make various equivalent modifications or changes according to the example given in FIG. 4, and such modifications or changes also fall within the scope of this embodiment of the present invention.

According to this embodiment of the present invention, that the indication signal indicates the one or more physical resource numbers includes: the indication signal includes a resource-pattern-of-transmission (Resource Pattern of Transmission, RPT for short) field, where the resource-pattern-of-transmission field is used to indicate the one or more physical resource numbers.

Specifically, referring to Table 1, for example, two bits 00 of the RPT field indicate a physical resource number 0. Two bits 01 of the RPT field indicate a physical resource number 1. Two bits 10 of the RPT field indicate a physical resource number 2. Two bits 11 of the RPT field indicate a physical resource number 3. More bits of the RPT field may further be used to represent other physical resource numbers. This is not limited in this embodiment of the present invention.

Optionally, the time resources occupied by the data signal in the N time resource groups have a same time resource number.

Specifically, referring to Table 1, if the data signal is sent by using time resources whose time resource numbers are all 0 in the five time resource groups, such a fixed time resource interval is unfavorable to randomization of interference between cells. For example, if two user equipments in two cells both send data signals by using time resources corresponding to the time resource number 0, the data signals of the two user equipments constantly collide with each other.

To resolve the problem in the foregoing embodiment, another embodiment is put forward. The processor 410 determines, according to formula (1), a time resource number n % ($n_{group}$) occupied by the data signal in a time resource group $n_{group}$.

Optionally, the processor 410 determines, according to formula (2), a time resource number n % ($n_{group}$) occupied by the data signal in a time resource group $n_{group}$.

It should be understood that, the time resource adjustment value $f(n_{group})$ may be a random number or any value determined in another manner. This is not limited in this embodiment of the present invention.

Optionally, when $N_{group}=1$, $f(n_{group})=0$; or when $N_{group} \geq 2$, the time resource adjustment value $f(n_{group})$ is determined according to formula (2a) or (2b).

Optionally, when $N_{group}=1$, $f(n_{group})=0$; or when $N_{group} \geq 2$, the time resource adjustment value $f(n_{group})$ is determined according to formula (3a) or (3b).

Optionally, when $N_{group}=1$, $f(n_{group})=0$; or when $N_{group}=2$, the time resource adjustment value $f(n_{group})$ is determined according to formula (3a) or (3b); or when $N_{group}>2$, the time resource adjustment value $f(n_{group})$ is determined according to formula (4a) or (4b).

In addition, in the foregoing embodiment, referring to Table 1, if the data signal is sent by using time resources whose time resource numbers are different in the five time resource groups, such an unfixed time resource interval is favorable to randomization of interference between cells.

Optionally, $\Delta_f = \tilde{f}_{RPT} \cdot n_{group}$ or $\Delta_f = (\mathrm{mod}(f\ \%_{RPT}, N_{group} - K) + K) \cdot n_{group}$, where $f\ \%_{RPT}$ is a frequency resource number determined according to any one of the one or more physical resource numbers indicated by the indication signal, and is zero or a positive integer, and K is a positive integer and $1 \leq K < N_{group}$.

Optionally, if any one of the one or more physical resource numbers indicated by the indication signal is p, n $\%_{RPT} = \mathrm{mod}(p, N_{group})$ and $f\ \%_{RPT} = \mathrm{floor}(p/N_{group})$, where floor( ) is a round-down function, and p is zero or a positive integer.

Optionally, if any one of the one or more physical resource numbers indicated by the indication signal includes a time resource number $x_{rpt}$ and a frequency resource number $f_{rpt}$, n $\%_{RPT} = x_{rpt}$, and $f\ \%_{RPT} = f_{rpt}$ or $\tilde{f}_{RPT} = f_{rpt} + \mathrm{Frequency\_hopping}(n_{group})$, where $\mathrm{Frequency\_hopping}(n_{group})$ is a frequency resource adjustment value of the time resource group $n_{group}$, and $x_{rpt}$ and $f_{rpt}$ are zero or positive integers.

It should be understood that, the frequency resource adjustment value $\mathrm{Frequency\_hopping}(n_{group})$ may be a random number or any value determined in another manner. This is not limited in this embodiment of the present invention.

Optionally, an initialization sequence of the pseudo-random sequence c(k) is as follows: $c_{init} = N_{ID}^{cell}$, or $c_{init} = 510$, or $c_{init} = 2^9 \cdot \mathrm{mod}(n_f, 4) + N_{ID}^{cell}$, or $c_{init} = 2^9 \cdot \mathrm{mod}(n_f, 4) + 510$, where $N_{ID}^{cell}$ is a physical layer cell identifier, and $n_f$ is a system frame quantity.

Optionally, the processor 410 obtains the time resource grouping information according to a correspondence between a time resource number and a time resource, where the correspondence between a time resource number and a time resource is preset, or is fed back by a receive end, or is provided by a third party, such as a base station.

Optionally, the time resource grouping information is as follows: if the time resources such as 20 subframes are grouped into five groups, each time resource group includes k time resources, each time resource includes t frequency resources, and there are a total of k×t physical resources, where k and t are positive integers, in each time resource group, time resource numbers of the physical resources are 0, 1, . . . , k−1, frequency resource numbers of the physical resources are 0, 1, . . . , t−1, and physical resource numbers of the physical resources are 0, 1, . . . , k×t−1.

Optionally, the indication signal includes one resource-pattern-of-transmission field, where the resource-pattern-of-transmission field is used to indicate a time resource number and a frequency resource number of the one or more physical resources.

Optionally, the indication signal includes two resource-pattern-of-transmission fields, where one resource-pattern-of-transmission field is used to indicate a time resource number of the one or more physical resources, and the other resource-pattern-of-transmission field is used to indicate a frequency resource number of the one or more physical resources.

It should be understood that, the resource-pattern-of-transmission field may be used, in multiple manners, to indicate a physical resource number or a time resource number and a frequency resource number that are included in the physical resource number. This is not limited in this embodiment of the present invention.

Therefore, in this embodiment of the present invention, because a time resource that carries a data signal can be accurately indicated, a receive end can receive the data signal without a need to perform blind detection, which reduces processing time and energy consumption of the receive end.

It should be understood that, in this embodiment of the present invention, the processor 410 may be a central processing unit (Central Processing Unit, "CPU" for short), or the processor 410 may be another general purpose processor, a digital signal processor (DSP), an application-specific integrated circuit (ASIC), a field programmable gate array (FPGA) or another programmable logic device, discrete gate or transistor logic device, discrete hardware component, or the like. The general purpose processor may be a microprocessor, or the processor may be any conventional processor, or the like.

The memory 420 may include a read-only memory and a random access memory, and provide an instruction and data to the processor 410. A part of the memory 420 may further include a nonvolatile random access memory. For example, the memory 420 may further store device-type information.

In addition to a data bus, the bus system 430 may include a power bus, a control bus, a status signal bus, and the like. However, for clarity of description, various buses are marked as the bus system 430 in the figure.

In an implementation process, the steps in the foregoing methods may be completed by using an integrated logic circuit of hardware in the processor 410 or an instruction in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically-erasable programmable memory, or a register. The storage medium is located in the memory 420. The processor 410 reads information in the memory 420 and completes the steps of the foregoing methods in combination with hardware of the processor 410. To avoid repetition, details are not described herein again.

It should be understood that, the user equipment 300 and the user equipment 400 according to the embodiments of the present invention may be corresponding to the first user equipment in the data transmission method in the embodiments of the present invention. The foregoing and other operations and/or functions of the modules in the user equipment 300 and the user equipment 400 are respectively used to implement corresponding procedures of the methods in FIG. 1. For brevity, details are not described herein again.

In addition, a computer readable media (or medium) is further provided, including a computer readable instruction that performs the following operation when the instruction is being executed: performing the operations of S110 to S140 in the method in the foregoing embodiment.

In addition, a computer program product is further provided, including the foregoing computer readable medium.

Figure 5:
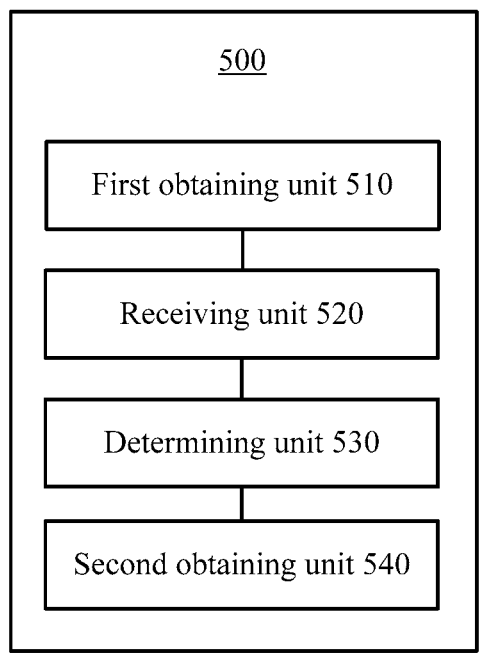
FIG. 5 is a schematic block diagram of user equipment according to still another embodiment of the present invention.
Figure 6:
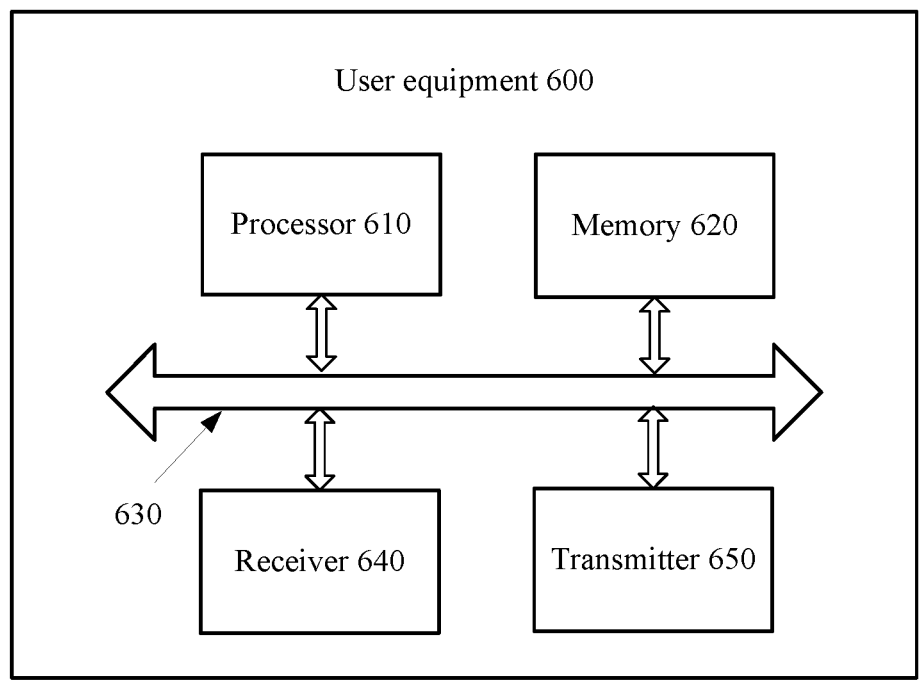
FIG. 6 is a schematic block diagram of user equipment according to yet another embodiment of the present invention.

With reference to FIG. 3 and FIG. 4, the foregoing describes in detail user equipment at a transmit end according to an embodiment of the present invention. With reference to FIG. 5 and FIG. 6, the following describes in detail user equipment at a receive end according to an embodiment of the present invention.

FIG. 5 shows a schematic block diagram of user equipment 500 according to an embodiment of the present invention. As shown in FIG. 5, the user equipment 500 includes a first obtaining unit 510, a receiving unit 520, a determining unit 530, and a second obtaining unit 540.

The first obtaining unit 510 is configured to obtain time resource grouping information, where the time resource grouping information includes physical resource numbers of physical resources in N time resource groups, and N is a positive integer.

It should be understood that, quantities of time resource numbers in the N time resource groups may be the same or different, and the time resource grouping information may be sent by a third party, such as a base station or a transmit end, or may be preset in the user equipment. This is not limited in this embodiment of the present invention.

Specifically, for example, the first obtaining unit 510 may obtain the time resource grouping information and the physical resource numbers of the physical resources in the N time resource groups that are shown in Table 1.

The receiving unit 520 is configured to receive an indication signal, such as a scheduling assignment signal (Scheduling Assignment, SA for short), where the indication signal indicates one or more physical resource numbers.

Specifically, the receiving unit 520 may receive the indication signal according to scheduling information of a base station. This is not limited in this embodiment of the present invention. For example, receiving unit 520 may receive the indication signal according to an indication of a transmit end, or may receive the indication signal according to a preset configuration.

The determining unit 530 is configured to determine, according to the time resource grouping information and the one or more physical resource numbers indicated by the indication signal, time resources (that is, time resource numbers) occupied by a data signal in the N time resource groups, where, for example, the data signal occupies only one time resource number in each time resource group.

It should be understood that, the determining unit 530 may obtain, by using multiple methods, the time resource numbers occupied by the data signal in the N time resource groups. The data signal may occupy one or more time resource numbers in each time resource group. This is not limited in this embodiment of the present invention.

The second obtaining unit 540 is configured to obtain the data signal according to the time resources (that is, time resources corresponding to the time resource numbers) occupied by the data signal in the N time resource groups.

It should be understood that, the second obtaining unit 540 may obtain the data signal by using multiple methods, for example, the second obtaining unit 540 simultaneously or sequentially obtains the time resources occupied by the data signal in the N time resource groups. This is not limited in this embodiment of the present invention.

With reference to FIG. 5, the foregoing describes in detail the user equipment according to this embodiment of the present invention.

The following further describes this embodiment of the present invention in detail with reference to a specific example. It should be noted that, the example in FIG. 5 is intended only to help a person skilled in the art understand this embodiment of the present invention, but is not intended to limit this embodiment of the present invention to a specific value or a specific scenario that is illustrated. Apparently, a person skilled in the art can make various equivalent modifications or changes according to the example given in FIG. 5, and such modifications or changes also fall within the scope of this embodiment of the present invention.

According to this embodiment of the present invention, that the indication signal indicates one or more physical resource numbers includes: the indication signal includes a resource-pattern-of-transmission (Resource Pattern of Transmission, RPT for short) field, where the resource-pattern-of-transmission field is used to indicate the one or more physical resource numbers.

Specifically, referring to Table 1, for example, two bits 00 of the RPT field indicate a physical resource number 0. Two bits 01 of the RPT field indicate a physical resource number 1. Two bits 10 of the RPT field indicate a physical resource number 2. Two bits 11 of the RPT field indicate a physical resource number 3. More bits of the RPT field may further be used to represent other physical resource numbers. This is not limited in this embodiment of the present invention.

Optionally, the time resources occupied by the data signal in the N time resource groups have a same time resource number.

Specifically, referring to Table 1, if the data signal is sent by using time resources whose time resource numbers are all 0 in the five time resource groups, such a fixed time resource interval is unfavorable to randomization of interference between cells. For example, if two user equipments in two cells both send data signals by using time resources corresponding to the time resource number 0, the data signals of the two user equipments constantly collide with each other.

To resolve the problem in the foregoing embodiment, another embodiment is put forward. The determining unit 530 is specifically configured to determine, according to formula (1), a time resource number n % ($n_{group}$) occupied by the data signal in a time resource group $n_{group}$.

Optionally, the determining unit 530 is specifically configured to determine, according to formula (2), a time resource number n % ($n_{group}$) occupied by the data signal in a time resource group $n_{group}$.

It should be understood that, the time resource adjustment value $f(n_{group})$ may be a random number or any value determined in another manner. This is not limited in this embodiment of the present invention.

Optionally, when $N_{group}=1$, $f(n_{group})=0$; or when $N_{group} \geq 2$, the time resource adjustment value $f(n_{group})$ is determined according to formula (2a) or (2b).

Optionally, when $N_{group}=1$, $f(n_{group})=0$; or when $N_{group} \geq 2$, the time resource adjustment value $f(n_{group})$ is determined according to formula (3a) or (3b).

Optionally, when $N_{group}=1$, $f(n_{group})=0$; or when $N_{group}=2$, the time resource adjustment value $f(n_{group})$ is determined according to formula (3a) or (3b); or when $N_{group}>2$, the time resource adjustment value $f(n_{group})$ is determined according to formula (4a) or (4b).

In addition, in the foregoing embodiment, referring to Table 1, if the data signal is sent by using time resources whose time resource numbers are different in the five time resource groups, such an unfixed time resource interval is favorable to randomization of interference between cells.

Optionally, $\Delta_f = \tilde{f}_{RPT} \cdot n_{group}$ or $\Delta_f = (\text{mod}(f\%_{RPT}, N_{group} - K) + K) \cdot n_{group}$, where $f\%_{RPT}$ is a frequency resource number determined according to any one of the one or more physical resource numbers indicated by the indication signal, and is zero or a positive integer, and K is a positive integer and $1 \leq K < N_{group}$.

Optionally, if any one of the one or more physical resource numbers indicated by the indication signal is p, n $\%_{RPT} = \text{mod}(p, N_{group})$ and $f\%_{RPT} = \text{floor}(p/N_{group})$, where floor( ) is a round-down function, and p is zero or a positive integer.

Optionally, if any one of the one or more physical resource numbers indicated by the indication signal includes a time resource number $x_{rpt}$ and a frequency resource number $f_{rpt}$, n $\%_{RPT} = x_{rpt}$, and $f\%_{RPT} = f_{rpt}$ or $\tilde{f}_{RPT} = f_{rpt} + \text{Frequency\_hopping}(n_{group})$, where Frequency_hopping($n_{group}$) is a frequency resource adjustment value of the time resource group $n_{group}$, and $x_{rpt}$ and $f_{rpt}$ are zero or positive integers.

It should be understood that, the frequency resource adjustment value Frequency_hopping($n_{group}$) may be a random number or any value determined in another manner. This is not limited in this embodiment of the present invention.

Optionally, an initialization sequence of the pseudo-random sequence c(k) is as follows: $c_{init} = N_{ID}^{cell}$, or $c_{init} = 510$, or $c_{init} = 2^9 \cdot \text{mod}(n_f, 4) + N_{ID}^{cell}$, or $c_{init} = 2^9 \cdot \text{mod}(n_f, 4) + 510$, where $N_{ID}^{cell}$ is a physical layer cell identifier, and $n_f$ is a system frame quantity.

Optionally, the first obtaining unit 510 is specifically configured to obtain the time resource grouping information according to a correspondence between a time resource number and a time resource, where the correspondence between a time resource number and a time resource is preset, or is fed back by a transmit end, or is provided by a third party, such as a base station.

Optionally, the time resource grouping information is as follows: if the time resources such as 20 subframes are grouped into five groups, each time resource group includes k time resources, each time resource includes t frequency resources, and there are a total of k×t physical resources, where k and t are positive integers, in each time resource group, time resource numbers of the physical resources are 0, 1, . . . , k−1, frequency resource numbers of the physical resources are 0, 1, ..., t−1, and physical resource numbers of the physical resources are 0, 1, ..., k×t−1.

Optionally, the indication signal includes one resource-pattern-of-transmission field, where the resource-pattern-of-transmission field is used to indicate a time resource number and a frequency resource number of the one or more physical resources.

Optionally, the indication signal includes two resource-pattern-of-transmission fields, where one resource-pattern-of-transmission field is used to indicate a time resource number of the one or more physical resources, and the other resource-pattern-of-transmission field is used to indicate a frequency resource number of the one or more physical resources.

It should be understood that, the resource-pattern-of-transmission field may be used, in multiple manners, to indicate a physical resource number or a time resource number and a frequency resource number that are included in the physical resource number. This is not limited in this embodiment of the present invention.

According to this embodiment of the present invention, the second obtaining unit 540 is specifically configured to determine, according to a correspondence between the time resource numbers occupied by the data signal in the N time resource groups and the time resources, the time resources corresponding to the resource numbers, and obtain the data signal by using the time resources occupied by the data signal in the N time resource groups, where the correspondence between the time resource numbers occupied by the data signal in the N time resource groups and the time resources is preset, is obtained from a transmit end, or is obtained from a third party, such as a base station.

Optionally, the receiving unit 520 is specifically configured to receive a correspondence between a time resource number and a time resource.

Therefore, in this embodiment of the present invention, because a time resource that carries a data signal can be accurately indicated, a receive end can receive the data signal without a need to perform blind detection, which reduces processing time and energy consumption of the receive end.

In another implementation manner, as shown in FIG. 6, an embodiment of the present invention further provides user equipment 600. The user equipment 600 includes a processor 610, a memory 620, a bus system 630, a receiver 640, and a transmitter 650. The processor 610, the memory 620, the receiver 640, and the transmitter 650 are connected by using the bus system 630. The memory 620 is configured to store an instruction. The processor 610 is configured to execute the instruction stored in the memory 620, to control the receiver 640 to receive a signal, an instruction, or a message, and control the transmitter 650 to send a signal, an instruction, or a message. The processor 610 is configured to: obtain time resource grouping information, where the time resource grouping information includes physical resource numbers of physical resources in N time resource groups, and N is a positive integer; determine, according to the time resource grouping information and one or more physical resource numbers indicated by an indication signal received by the receiver 640, time resources (that is, time resource numbers) occupied by a data signal in the N time resource groups, where, for example, the data signal occupies only one time resource number in each time resource group; and obtain the data signal according to the time resources occupied by the data signal in the N time resource groups. The receiver 640 is configured to receive the indication signal, such as a scheduling assignment signal (Scheduling Assignment, SA for short), where the indication signal indicates the one or more physical resource numbers.

With reference to FIG. 6, the foregoing describes in detail the user equipment according to this embodiment of the present invention.

The following further describes this embodiment of the present invention in detail with reference to a specific example. It should be noted that, the example in FIG. 6 is intended only to help a person skilled in the art understand this embodiment of the present invention, but is not intended to limit this embodiment of the present invention to a specific value or a specific scenario that is illustrated. Apparently, a person skilled in the art can make various equivalent modifications or changes according to the example given in FIG. 6, and such modifications or changes also fall within the scope of this embodiment of the present invention.

According to this embodiment of the present invention, that the indication signal indicates the one or more physical resource numbers includes: the indication signal includes a resource-pattern-of-transmission (Resource Pattern of Transmission, RPT for short) field, where the resource-pattern-of-transmission field is used to indicate the one or more physical resource numbers.

Specifically, referring to Table 1, for example, two bits 00 of the RPT field indicate a physical resource number 0. Two bits 01 of the RPT field indicate a physical resource number 1. Two bits 10 of the RPT field indicate a physical resource number 2. Two bits 11 of the RPT field indicate a physical resource number 3. More bits of the RPT field may further be used to represent other physical resource numbers. This is not limited in this embodiment of the present invention.

Optionally, the time resources occupied by the data signal in the N time resource groups have a same time resource number.

Specifically, referring to Table 1, if the data signal is sent by using time resources whose time resource numbers are all 0 in the five time resource groups, such a fixed time resource interval is unfavorable to randomization of interference between cells. For example, if two user equipments in two cells both send data signals by using time resources corresponding to the time resource number 0, the data signals of the two user equipments constantly collide with each other.

To resolve the problem in the foregoing embodiment, another embodiment is put forward. The processor 610 determines, according to formula (1), a time resource number n % ($n_{group}$) occupied by the data signal in a time resource group $n_{group}$.

Optionally, the processor 610 determines, according to formula (2), a time resource number n % ($n_{group}$) occupied by the data signal in a time resource group $n_{group}$.

It should be understood that, the time resource adjustment value $f(n_{group})$ may be a random number or any value determined in another manner. This is not limited in this embodiment of the present invention.

Optionally, when $N_{group}=1$, $f(n_{group})=0$; or when $N_{group} \geq 2$, the time resource adjustment value $f(n_{group})$ is determined according to formula (2a) or (2b).

Optionally, when $N_{group}=1$, $f(n_{group})=0$; or when $N_{group} \geq 2$, the time resource adjustment value $f(n_{group})$ is determined according to formula (3a) or (3b).

Optionally, when $N_{group}=1$, $f(n_{group})=0$; or when $N_{group}=2$, the time resource adjustment value $f(n_{group})$ is determined according to formula (3a) or (3b); or when $N_{group}>2$, the time resource adjustment value $f(n_{group})$ is determined according to formula (4a) or (4b).

In addition, in the foregoing embodiment, referring to Table 1, if the data signal is sent by using time resources whose time resource numbers are different in the five time resource groups, such an unfixed time resource interval is favorable to randomization of interference between cells.

Optionally, $\Delta_f = f_{RPT} \cdot n_{group}$ or $\Delta_f = (mod(f \%_{RPT}, N_{group} - K) + K) \cdot n_{group}$, where $f \%_{RPT}$ is a frequency resource number determined according to any one of the one or more physical resource numbers indicated by the indication signal, and is zero or a positive integer, and K is a positive integer and $1 \leq K < N_{group}$.

Optionally, if any one of the one or more physical resource numbers indicated by the indication signal is p, $n \%_{RPT} = mod(p, N_{group})$ and $f \%_{RPT} = floor(p/N_{group})$, where floor( ) is a round-down function, and p is zero or a positive integer.

Optionally, if any one of the one or more physical resource numbers indicated by the indication signal includes a time resource number $x_{rpt}$ and a frequency resource number $f_{rpt}$, $n \%_{RPT} = x_{rpt}$, and $f \%_{RPT} = f_{rpt}$ or $f_{RPT} = f_{rpt} + $ Frequency_hopping($n_{group}$), where Frequency_hopping($n_{group}$) is a frequency resource adjustment value of the time resource group $n_{group}$, and $x_{rpt}$ and $f_{rpt}$ are zero or positive integers.

It should be understood that, the frequency resource adjustment value Frequency_hopping($n_{group}$) may be a random number or any value determined in another manner. This is not limited in this embodiment of the present invention.

Optionally, an initialization sequence of the pseudo-random sequence c(k) is as follows: $c_{init} = N_{ID}^{cell}$, or $c_{init} = 510$, or $c_{init} = 2^9 \cdot mod(n_f, 4) + N_{ID}^{cell}$, or $c_{init} = 2^9 \cdot mod(n_f, 4) + 510$, where $N_{ID}^{cell}$ is a physical layer cell identifier, and $n_f$ is a system frame quantity.

Optionally, the processor 610 obtains the time resource grouping information according to a correspondence between a time resource number and a time resource, where the correspondence between a time resource number and a time resource is preset, or is fed back by a transmit end, or is provided by a third party, such as a base station.

Optionally, the time resource grouping information is as follows: if the time resources such as 20 subframes are grouped into five groups, each time resource group includes k time resources, each time resource includes t frequency resources, and there are a total of k×t physical resources, where k and t are positive integers, in each time resource group, time resource numbers of the physical resources are 0, 1, . . . , k−1, frequency resource numbers of the physical resources are 0, 1, . . . , t−1, and physical resource numbers of the physical resources are 0, 1, . . . , k×t−1.

Optionally, the indication signal includes one resource-pattern-of-transmission field, where the resource-pattern-of-transmission field is used to indicate a time resource number and a frequency resource number of the one or more physical resources.

Optionally, the indication signal includes two resource-pattern-of-transmission fields, where one resource-pattern-of-transmission field is used to indicate a time resource number of the one or more physical resources, and the other resource-pattern-of-transmission field is used to indicate a frequency resource number of the one or more physical resources.

It should be understood that, the resource-pattern-of-transmission field may be used, in multiple manners, to indicate a physical resource number or a time resource number and a frequency resource number that are included in the physical resource number. This is not limited in this embodiment of the present invention.

According to this embodiment of the present invention, the receiver 640 receives a correspondence between a time resource number and a time resource.

Optionally, the processor 610 determines, according to a correspondence between the time resource numbers occupied by the data signal in the N time resource groups and time resources, the time resources corresponding to the resource numbers, and obtains the data signal by using the time resources occupied by the data signal in the N time resource groups, where the correspondence between the time resource numbers occupied by the data signal in the N time resource groups and the time resources is preset, is obtained from a transmit end, or is obtained from a third party, such as a base station.

Therefore, in this embodiment of the present invention, because a time resource that carries a data signal can be accurately indicated, a receive end can receive the data signal without a need to perform blind detection, which reduces processing time and energy consumption of the receive end.

It should be understood that, in this embodiment of the present invention, the processor 610 may be a central processing unit (Central Processing Unit, "CPU" for short), or the processor 610 may be another general purpose processor, a digital signal processor (DSP), an application-specific integrated circuit (ASIC), a field programmable gate array (FPGA) or another programmable logic device, discrete gate or transistor logic device, discrete hardware component, or the like. The general purpose processor may be a microprocessor, or the processor may be any conventional processor, or the like.

The memory 620 may include a read-only memory and a random access memory, and provide an instruction and data to the processor 610. A part of the memory 620 may further include a nonvolatile random access memory. For example, the memory 620 may further store device-type information.

In addition to a data bus, the bus system 630 may include a power bus, a control bus, a status signal bus, and the like. However, for clarity of description, various buses are marked as the bus system 630 in the figure.

In an implementation process, the steps in the foregoing methods may be completed by using an integrated logic circuit of hardware in the processor 610 or an instruction in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically-erasable programmable memory, or a register. The storage medium is located in the memory 620. The processor 610 reads information in the memory 620 and completes the steps of the foregoing methods in combination with hardware of the processor 610. To avoid repetition, details are not described herein again.

It should further be understood that, the user equipment 500 and the user equipment 600 according to the embodiments of the present invention may be corresponding to the second user equipment in the data transmission method in the embodiments of the present invention. The foregoing and other operations and/or functions of the modules in the user equipment 500 and the user equipment 600 are respectively used to implement corresponding procedures of the methods in FIG. 2. For brevity, details are not described herein again.

In addition, a computer readable media (or medium) is further provided, including a computer readable instruction that performs the following operation when the instruction is being executed: performing the operations of S210 to S240 in the method in the foregoing embodiment.

In addition, a computer program product is further provided, including the foregoing computer readable medium.

It should be noted that, the signal mentioned in this specification includes but is not limited to an indication, information, signaling, a message, or the like. This is not limited herein.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is only exemplary. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements, to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are only specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
obtaining, by first user equipment, time resource grouping information, wherein the time resource grouping information comprises physical resource numbers of physical resources in N time resource groups, and N is a positive integer; wherein N×k subframes as time resources are grouped into N groups, each time resource group includes k time resources, each time resource includes t frequency resources, and there are a total of k×t physical resources, where k and t are positive integers, in each time resource group, time resource numbers of the physical resources are 0, 1, . . . , k−1, frequency resource numbers of the physical resources are 0, 1, . . . , t−1, and physical resource numbers of the physical resources are 0, 1, . . . , k×t−1;
sending, by the first user equipment, an indication signal, wherein the indication signal indicates one or more physical resource numbers;
determining, by the first user equipment according to the time resource grouping information and the one or more physical resource numbers indicated by the indication signal, time resources occupied by a data signal in the N time resource groups; and
sending, by the first user equipment, the data signal by using the time resources occupied by the data signal in the N time resource groups.

2. The method according to claim 1, wherein the determining, by the first user equipment according to the time resource grouping information and the one or more physical resource numbers indicated by the indication signal, time resources occupied by the data signal in the N time resource groups comprises: determining, by the first user equipment according to a formula $ñ_{subframe}(n_{group}) = \mathrm{mod}\ (ñ_{RPT} + \Delta_f, N_{group})$, a time resource number $ñ(n_{group})$ occupied by the data signal in a time resource group $n_{group}$, wherein mod( ) is a mod function; $n_{group}$ is a time resource group sequence number, and is zero or a positive integer; $\tilde{n}_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer; and $\Delta_f$ is a time resource adjustment value determined according to a physical resource number.

3. The method according to claim 1, wherein the determining, by the first user equipment according to the time resource grouping information and the one or more physical resource numbers indicated by the indication signal, time resources occupied by the data signal in the N time resource groups comprises: determining, by the first user equipment according to a formula $\tilde{n}_{subframe}(n_{group})=\mathrm{mod}(\tilde{n}_{RPT}+\Delta_f+f_{hop}(n_{group}),N_{group})$, a time resource number $\tilde{n}(n_{group})$ occupied by the data signal in a time resource group $n_{group}$, wherein mod( ) is a mod function; $n_{group}$ is a time resource group sequence number, and is zero or a positive integer; $\tilde{n}_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer; $f(n_{group})$ is a time resource adjustment value of the time resource group $n_{group}$; and $\Delta_f$ is a time resource adjustment value determined according to a physical resource number.

4. The method according to claim 3, wherein responsive to $N_{group}=1$, $f(n_{group})=0$; or responsive to $N_{group}\geq 2$, $$f(n_{group}) = \mathrm{mod}\left(\sum_{k=n_{group}\cdot M}^{n_{group}\cdot M+M-1} c(k)\times 2^{k-(n_{group}\cdot M)}, N_{group}\right) \text{ or }$$

$$f(n_{group}) = \sum_{k=n_{group}\cdot M}^{n_{group}\cdot M+M-1} c(k)\times 2^{k-(n_{group}\cdot M)},$$

wherein M is a positive integer that is not less than $\log_2^{N_{group}}$, and $c(k)$ is a pseudo-random sequence.

5. The method according to claim 3, wherein responsive to $N_{group}1$, $f(n_{group})=0$; or responsive to $N_{group}\geq 2$, $$f(n_{group}) = \mathrm{mod}\left(f(n_{group}-1) + \sum_{k=n_{group}\cdot M}^{n_{group}\cdot M+M-1} c(k)\times 2^{k-(n_{group}\cdot M)}, N_{group}\right)$$

or $$f(n_{group}) = f(n_{group}-1) + \sum_{k=n_{group}\cdot M}^{n_{group}\cdot M+M-1} c(k)\times 2^{k-(n_{group}\cdot M)},$$

wherein M is a positive integer that is not less than $\log_2^{N_{group}}$, $c(k)$ is a pseudo-random sequence, and $f(-1)=0$.

6. The method according to claim 5, wherein responsive to $N_{group}>2$, $$f(n_{group}) = \mathrm{mod}\left(f(n_{group}-1) + \mathrm{mod}\left(\sum_{k=n_{group}\cdot M}^{n_{group}\cdot M+M-1} c(k)\times 2^{k-(n_{group}\cdot M)}, N_{group}-L\right)+L, N_{group}\right)$$

or $$f(n_{group}) = f(n_{group}-1) + \mathrm{mod}\left(\sum_{k=n_{group}\cdot M}^{n_{group}\cdot M+M-1} c(k)\times 2^{k-(n_{group}\cdot M)}, N_{group}-L\right)+L,$$

wherein L is a positive integer and $1\leq L<N_{group}$.

7. The method according to claim 1, wherein the time resources occupied by the data signal in the N time resource groups have a same time resource number.

8. The method according to claim 2, wherein $\Delta_f=\tilde{f}_{RPT}\cdot n_{group}$ or $\Delta_f=(\mathrm{mod}(\tilde{f}_{RPT},N_{group}-K)+K)\cdot n_{group}$, wherein $\tilde{f}_{RPT}$ is a frequency resource number determined according to any one of the one or more physical resource numbers indicated by the indication signal, and is zero or a positive integer, and K is a positive integer and $1\leq K<N_{group}$.

9. The method according to claim 8, wherein responsive to any one of the one or more physical resource numbers indicated by the indication signal is p, $\tilde{n}_{RPT}=\mathrm{mod}(p,N_{group})$ and $\tilde{f}_{RPT}=\mathrm{floor}(p/N_{group})$, wherein floor( ) is a round-down function, and p is zero or a positive integer.

10. The method according to claim 8, wherein responsive to any one of the one or more physical resource numbers indicated by the indication signal comprises a time resource number $x_{rpt}$ and a frequency resource number $\hat{f}_{rpt}$, $\tilde{n}_{RPT}=x_{rpt}$, and $\tilde{f}_{RPT}=f_{rpt}$ or $\tilde{f}_{RPT}=f_{rpt}+\mathrm{Frequency\_hopping}(n_{group})$, wherein $\mathrm{Frequency\_hopping}(n_{group})$ is a frequency resource adjustment value of the time resource group $n_{group}$, and $x_{rPt}$ and $f^{rpt}$ are zero or positive integers.

11. User equipment, comprising:
a processor; and
a memory coupled to the processor, and having processor-executable instructions stored thereon, which when executed cause the processor to implement operations including:
obtaining time resource grouping information, wherein the time resource grouping information comprises physical resource numbers of physical resources in N time resource groups, and N is a positive integer; wherein N×k subframes as time resources are grouped into N groups, each time resource group includes k time resources, each time resource includes t frequency resources, and there are a total of k×t physical resources, where k and t are positive integers, in each time resource group, time resource numbers of the physical resources are 0, 1, . . . , k−1, frequency resource numbers of the physical resources are 0, 1, . . . , t−1, and physical resource numbers of the physical resources are 0, 1, . . . , k×t−1;
sending an indication signal, wherein the indication signal indicates one or more physical resource numbers;
determining, according to the time resource grouping information and the one or more physical resource numbers indicated by the indication signal, time resources occupied by a data signal in the N time resource groups; and
sending the data signal by using the time resources occupied by the data signal in the N time resource groups.

12. The user equipment according to claim 11, wherein the operations further include:
determining, according to a formula $\tilde{n}_{subframe}(n_{group})=\mathrm{mod}(\tilde{n}_{RPT}+\Delta_f,N_{group})$, a time resource number $\tilde{n}(n_{group})$ occupied by the data signal in a time resource group $n_{group}$, wherein mod( ) is a mod function; $n_{group}$ is a time resource group sequence number, and is zero or a positive integer; $\tilde{n}_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer; and $\Delta_f$ is a time resource adjustment value determined according to a physical resource number.

13. The user equipment according to claim 11, wherein the operations further include:
determining, according to a formula $\tilde{n}_{subframe}(n_{group})=\text{mod } (\tilde{n}_{RPT}+\Delta_f+f_{hop}(n_{group}), N_{group})$, a time resource number $\tilde{n}(n_{group})$ occupied by the data signal in a time resource group $n_{group}$, wherein mod( ) is a mod function; $n_{group}$ is a time resource group sequence number, and is zero or a positive integer; $\tilde{n}_{RPT}$ is a time resource number determined according to any one of the one or more physical resource numbers indicated by the indication signal, and is zero or a positive integer; $N_{group}$ is a quantity of time resources in the time resource group $n_{group}$, and is a positive integer; $f(n_{group})$ is a time resource adjustment value of the time resource group $n_{group}$; $\Delta_f$ is a time resource adjustment value determined according to a physical resource number.

14. The user equipment according to claim 13, wherein responsive to $N_{group}=1$, $f(n_{group})=0$; or responsive to $N_{group}\geq 2$, $$f(n_{group}) = \text{mod}\left(\sum_{k=n_{group}\cdot M}^{n_{group}\cdot M+M-1} c(k)\times 2^{k-(n_{group}\cdot M)}, N_{group}\right) \text{ or}$$

$$f(n_{group}) = \sum_{k=n_{group}\cdot M}^{n_{group}\cdot M+M-1} c(k)\times 2^{k-(n_{group}\cdot M)},$$

wherein M is a positive integer that is not less than $\log_2^{N_{group}}$, and c(k) is a pseudo-random sequence.

15. The user equipment according to claim 13, wherein responsive to $N_{group}=1$, $f(n_{group})=0$; or responsive to $N_{group}\geq 2$, $$f(n_{group}) = \text{mod}\left(f(n_{group}-1)+\sum_{k=n_{group}\cdot M}^{n_{group}\cdot M+M-1} c(k)\times 2^{k-(n_{group}\cdot M)}, N_{group}\right)$$

or $$f(n_{group}) = f(n_{group}-1)+\sum_{k=n_{group}\cdot M}^{n_{group}\cdot M+M-1} c(k)\times 2^{k-(n_{group}\cdot M)},$$

wherein M is a positive integer that is not less than $\log_2^{N_{group}}$, c(k) is a pseudo-random sequence, and f(-1)=0.

16. The user equipment according to claim 15, wherein responsive to $N_{group}>2$, $$f(n_{group}) = \text{mod}\Bigg(f(n_{group}-1)+$$
$$\text{mod}\left(\sum_{k=n_{group}\cdot M}^{n_{group}\cdot M+M-1} c(k)\times 2^{k-(n_{group}\cdot M)}, N_{group}-L\right)+L, N_{group}\Bigg)$$

or $$f(n_{group}) =$$
$$f(n_{group}-1)+\text{mod}\left(\sum_{k=n_{group}\cdot M}^{n_{group}\cdot M+M-1} c(k)\times 2^{k-(n_{group}\cdot M)}, N_{group}-L\right)+L,$$

wherein L is a positive integer and $1\leq L<N_{group}$.

17. The user equipment according to claim 11, wherein the time resources occupied by the data signal in the N time resource groups have a same time resource number.

18. The user equipment according to claim 12, wherein $\Delta_f=\tilde{f}_{RPT}\cdot n_{group}$ or $\Delta_f=(\text{mod}(\tilde{f}_{RPT},N_{group}-K)+K)\cdot n_{group}$, wherein $\tilde{f}_{RPT}$ is a frequency resource number determined according to any one of the one or more physical resource numbers indicated by the indication signal, and is zero or a positive integer, and K is a positive integer and $1\leq K<N_{group}$.

19. The user equipment according to claim 18, wherein responsive to any one of the one or more physical resource numbers indicated by the indication signal is p, $\tilde{n}_{RPT}=\text{mod}(p, N_{group})$ and $\tilde{f}_{RPT}=\text{floor}(p/N_{group})$, wherein floor( ) is a round-down function, and p is zero or a positive integer.

20. The user equipment according to claim 18, wherein responsive to any one of the one or more physical resource numbers indicated by the indication signal comprises a time resource number $x_{rpt}$ and a frequency resource number $f_{rpt}$, $\tilde{n}_{RPT}=x_{rpt}$, and $\tilde{f}_{RPT}=f_{rpt}$ or $\tilde{f}_{RPT}=f_{rpt}+\text{Frequency\_hopping}(n_{group})$, wherein Frequency_hopping($n_{group}$) is a frequency resource adjustment value of the time resource group $n_{group}$, and $x_{rpt}$ and $f_{rpt}$ are zero or positive integers.

* * * * *